US008538867B1

(12) United States Patent
Caballero et al.

(10) Patent No.: US 8,538,867 B1
(45) Date of Patent: Sep. 17, 2013

(54) FINANCIAL TRANSACTION SYSTEM

(75) Inventors: Crispina O Caballero, Ontario (CA); Thomas F Conroy, Englewood, CO (US); Steven A Eisenberg, Atlanta, GA (US); Brian G Holland, Needham, MA (US); Stephen F Kraysler, Hull, MA (US); Richard W Mann, Greensboro, NC (US); Charles M Underwood, II, Scotts, MI (US)

(73) Assignee: Mann Conroy Eisenberg & Associates, LLC, Greensboro, NC (US)

(*) Notice: Subject to any disclaimer, the term of this patent is extended or adjusted under 35 U.S.C. 154(b) by 200 days.

(21) Appl. No.: 12/498,290

(22) Filed: Jul. 6, 2009

Related U.S. Application Data

(63) Continuation-in-part of application No. 10/687,063, filed on Oct. 16, 2003, now Pat. No. 7,558,757, and a continuation-in-part of application No. 10/839,068, filed on May 5, 2004, now Pat. No. 7,792,729, and a continuation-in-part of application No. 11/341,735, filed on Jan. 27, 2006, now abandoned, and a continuation-in-part of application No. 11/355,442, filed on Feb. 16, 2006, now abandoned, and a continuation-in-part of application No. 11/828,954, filed on Jul. 26, 2007, now abandoned, and a continuation-in-part of application No. 11/847,241, filed on Aug. 29, 2007, said application No. 11/355,442 is a continuation of application No. 11/341,735.

(60) Provisional application No. 60/468,284, filed on May 5, 2003, provisional application No. 60/833,334, filed on Jul. 26, 2006, provisional application No. 60/446,811, filed on Feb. 12, 2003, provisional application No. 60/841,102, filed on Aug. 29, 2006.

(51) Int. Cl.
*G06Q 40/00* (2012.01)

(52) U.S. Cl.
USPC ............................................ 705/38; 705/36 R

(58) Field of Classification Search
USPC ................................................. 705/38, 36 R
See application file for complete search history.

(56) References Cited

U.S. PATENT DOCUMENTS

| | | | |
|---|---|---|---|
| 6,138,102 A * | 10/2000 | Hinckley, Jr. | 705/36 R |
| 6,304,858 B1 * | 10/2001 | Mosler et al. | 705/37 |
| 7,024,386 B1 * | 4/2006 | Mills et al. | 705/37 |
| 2012/0239551 A1 | 9/2012 | Caballero et al. | |

OTHER PUBLICATIONS

U.S. Appl. No. 13/270,768, filed on Oct. 11, 2011, titled "Computer System for Controlling a System of Managing Fluctuating Cash Flows", first named inventor: Caballero, Crispina O. et al. USA.

* cited by examiner

*Primary Examiner* — Daniel Felten
(74) *Attorney, Agent, or Firm* — Peter K. Trzyna, Esq.

(57) ABSTRACT

A machine, manufacture, process, composition, and product produced thereby Representatively, there can be a computer-aided method for managing cash flows for a transaction, the method including the steps of: receiving respective descriptions of risks; receiving statistical assumptions for said risks; receiving financial assumptions for said risks; calculating, from the descriptions and the assumptions, expected cash flows corresponding to said risks for time periods; receiving actual cash flows information from occurrence of events corresponding to said risks; accounting for a first party to the transaction owing the expected cash flows to a second party to the transaction; accounting for the second party owing the actual cash flows to the first party; and computing a net settlement, for each of said time periods, between the parties in the transaction to manage the actual cash flows and the expected cash flows.

18 Claims, 18 Drawing Sheets

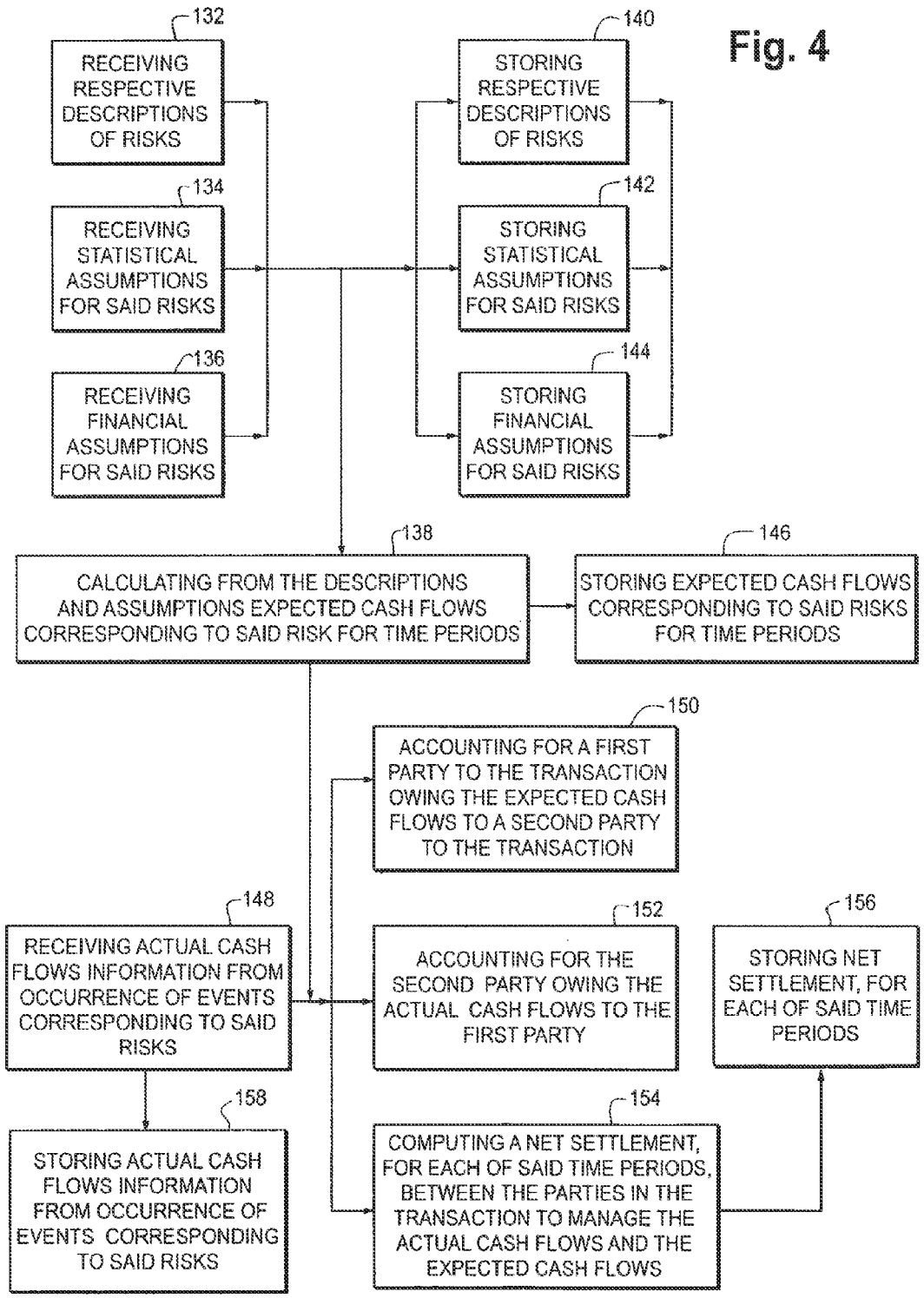

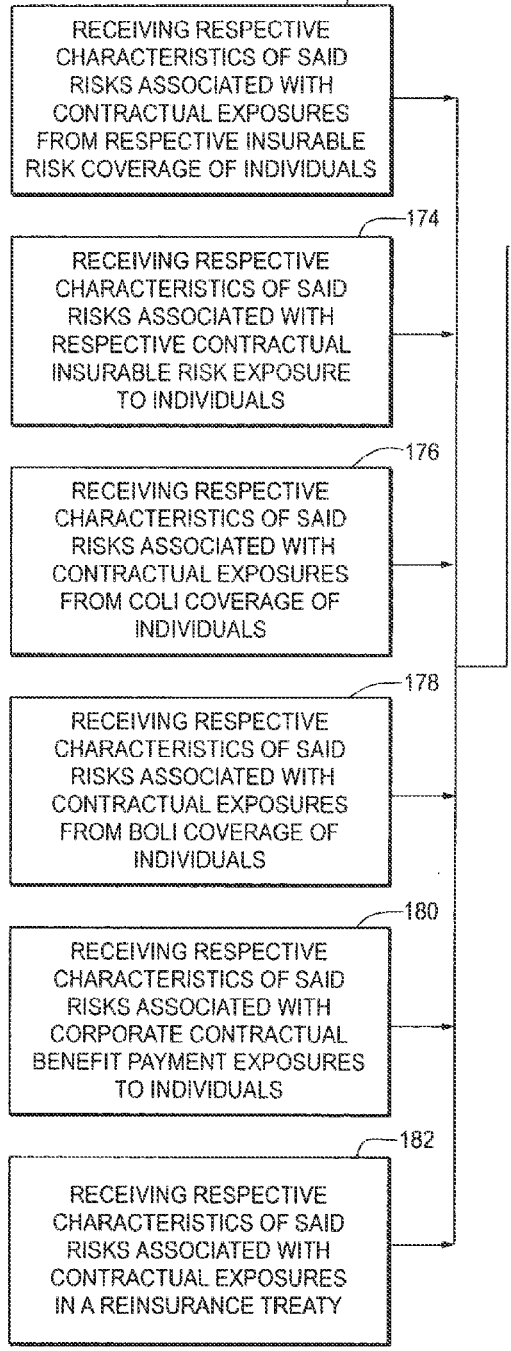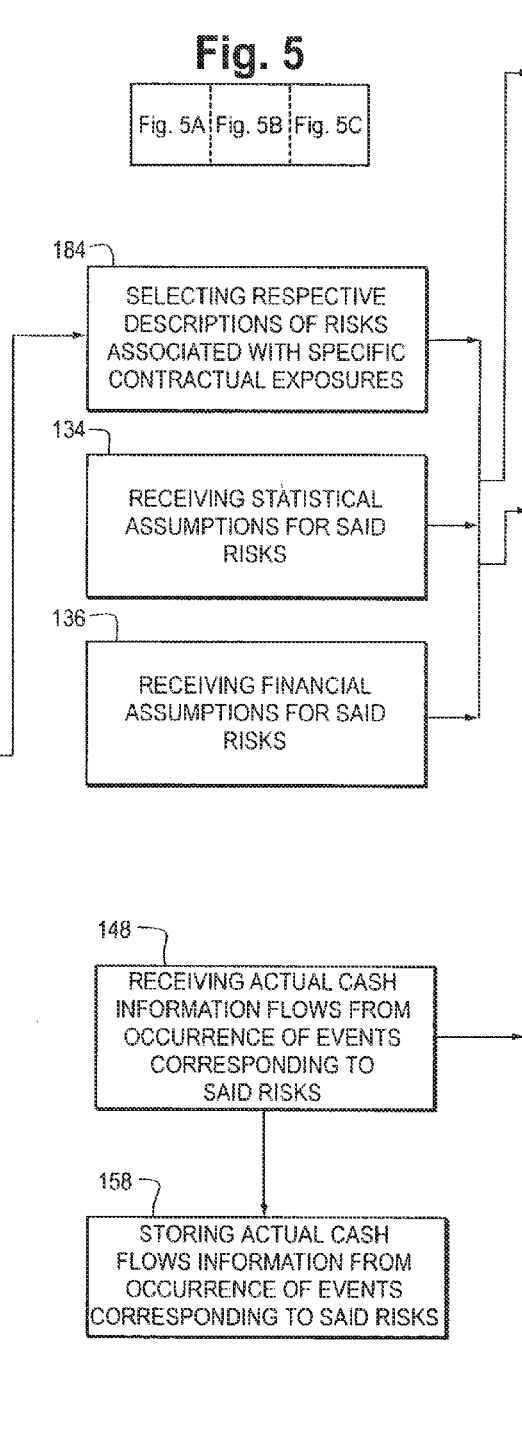

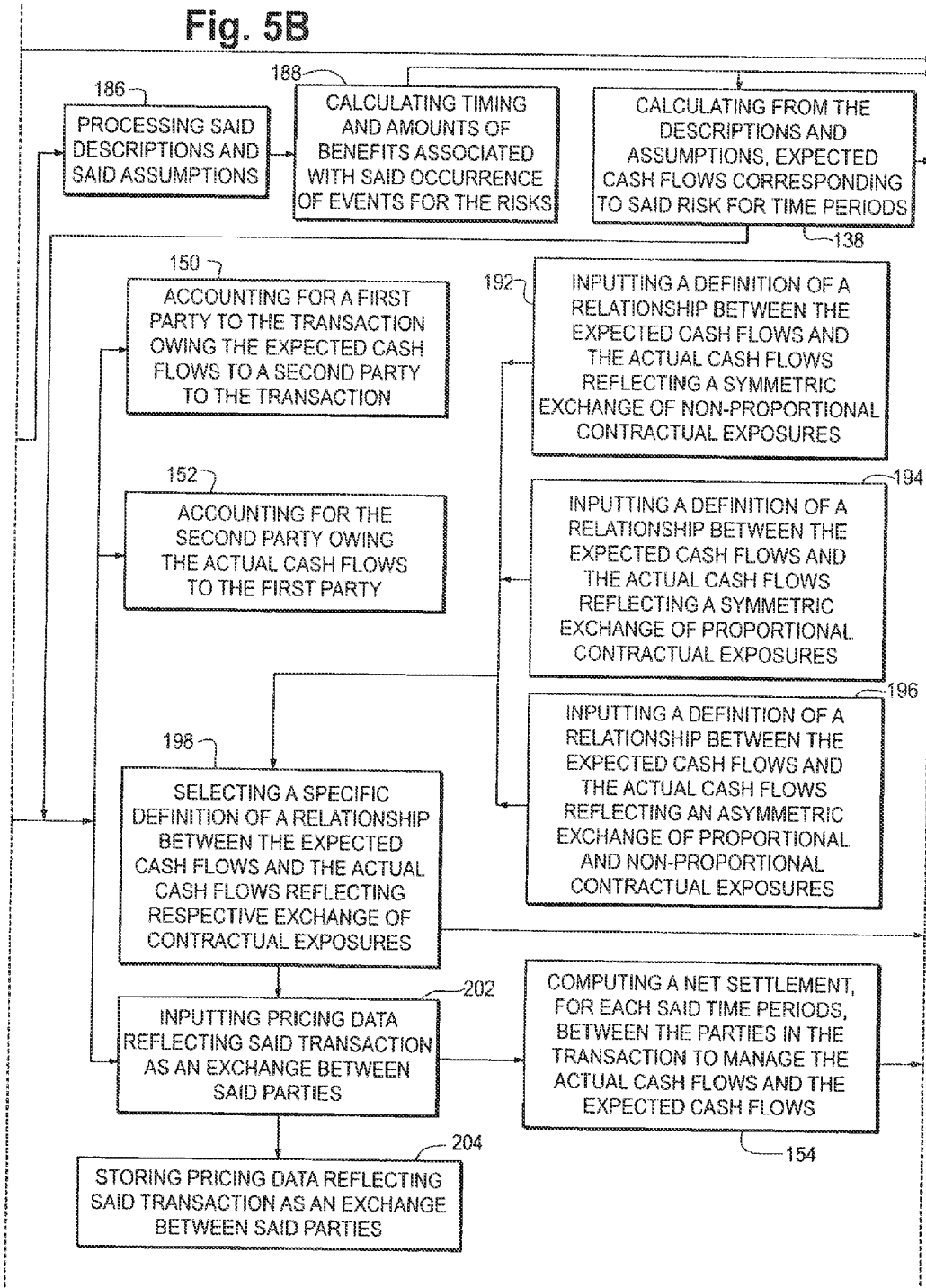

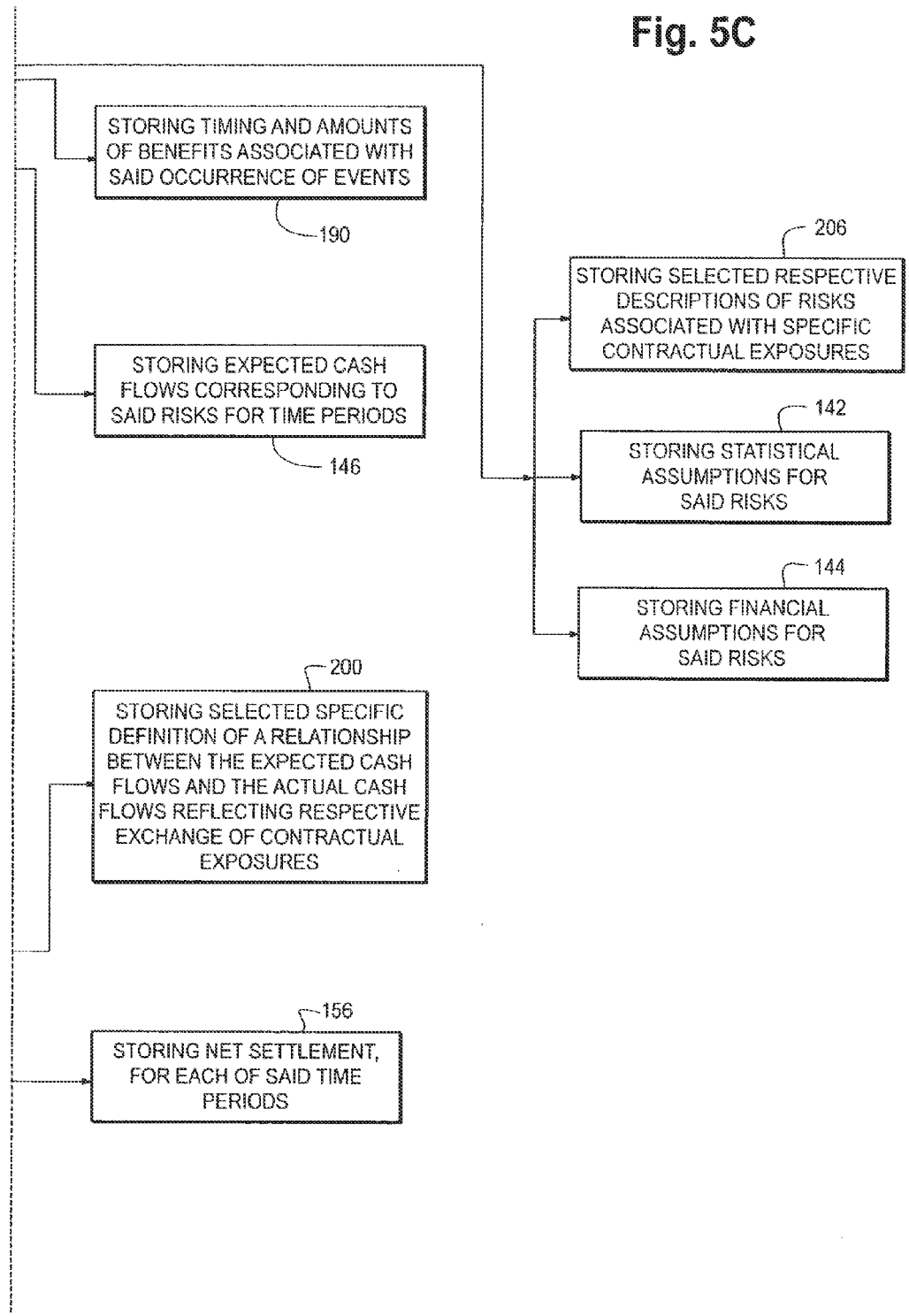

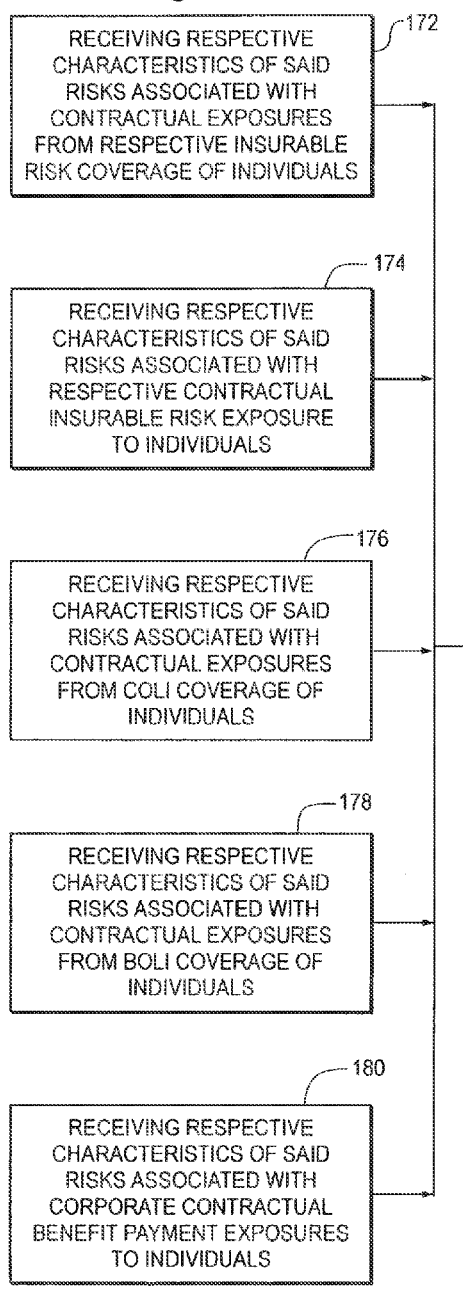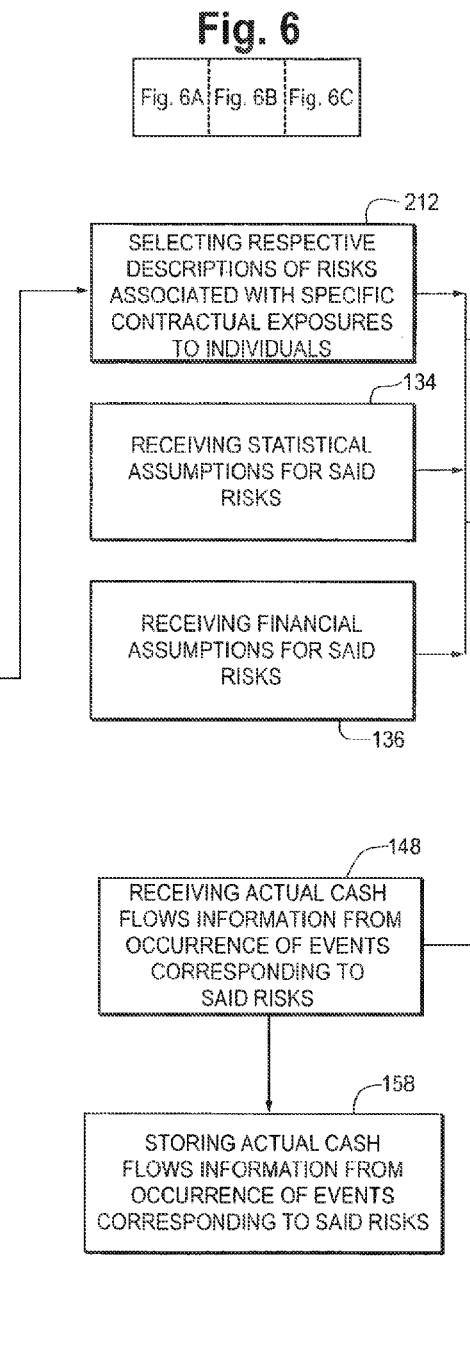

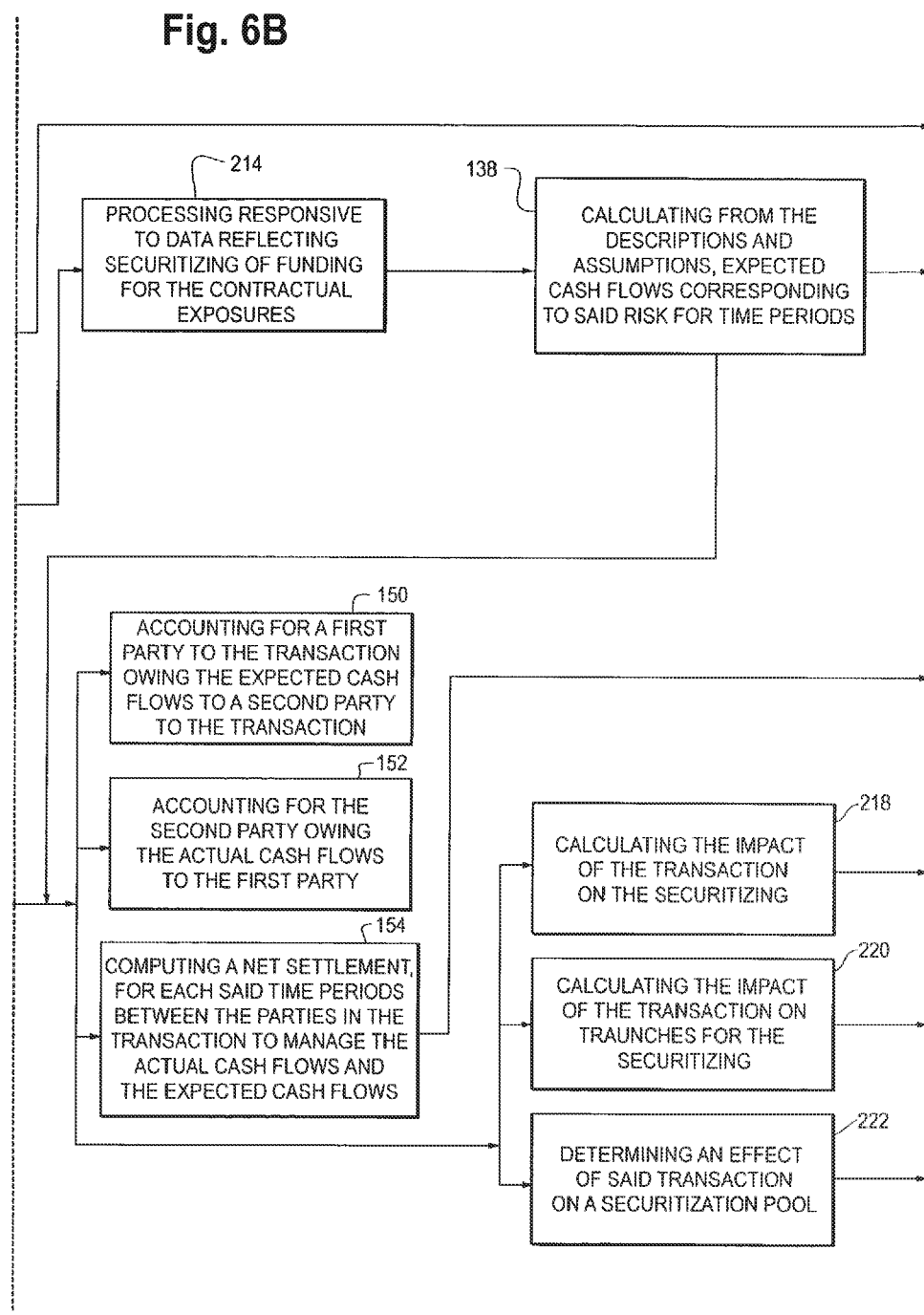

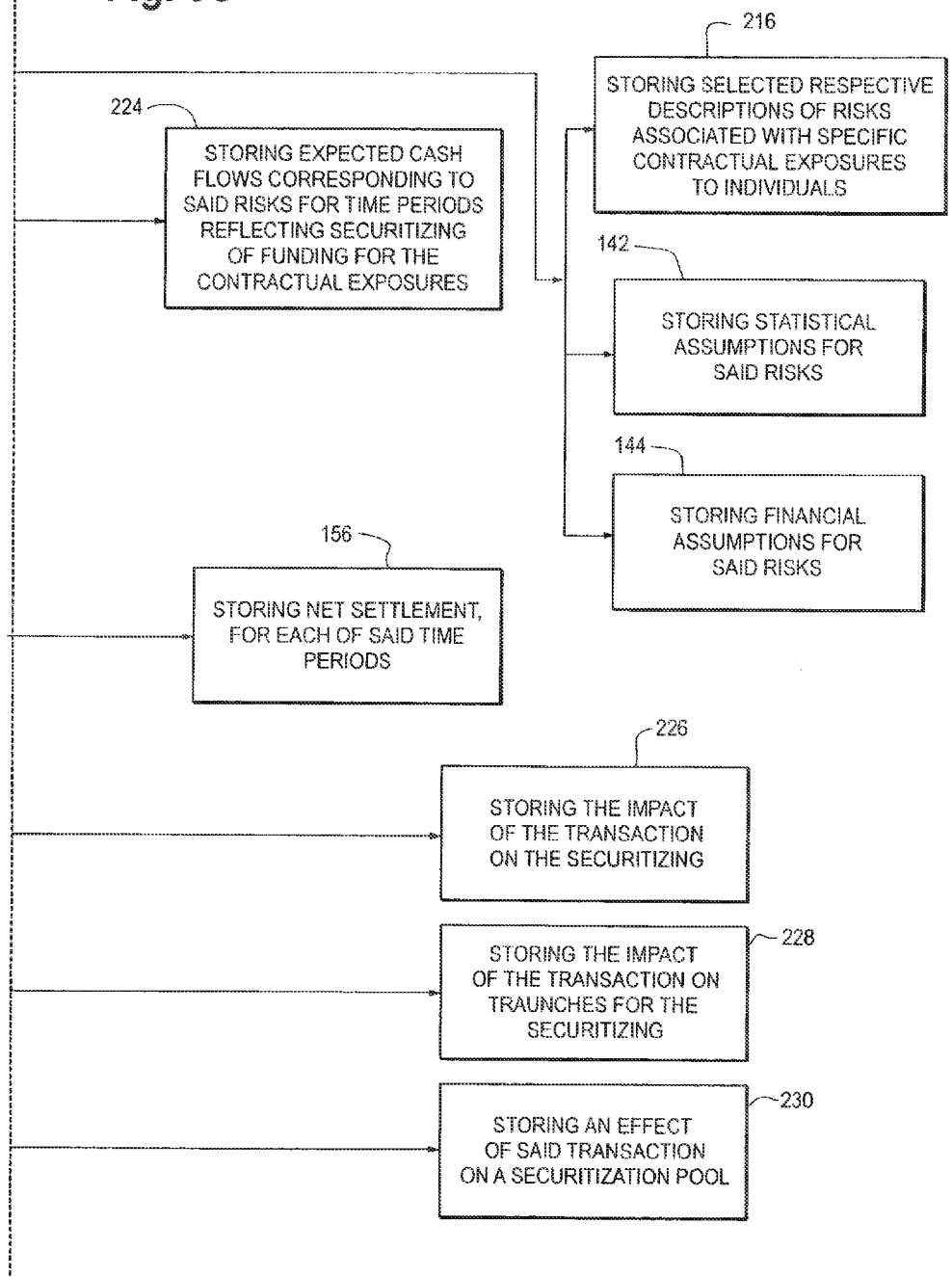

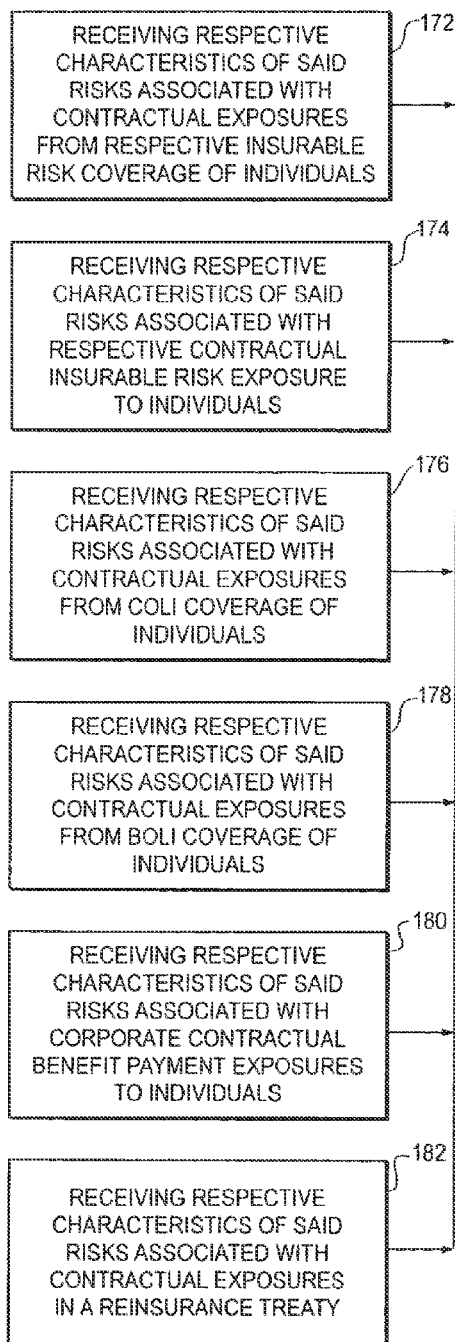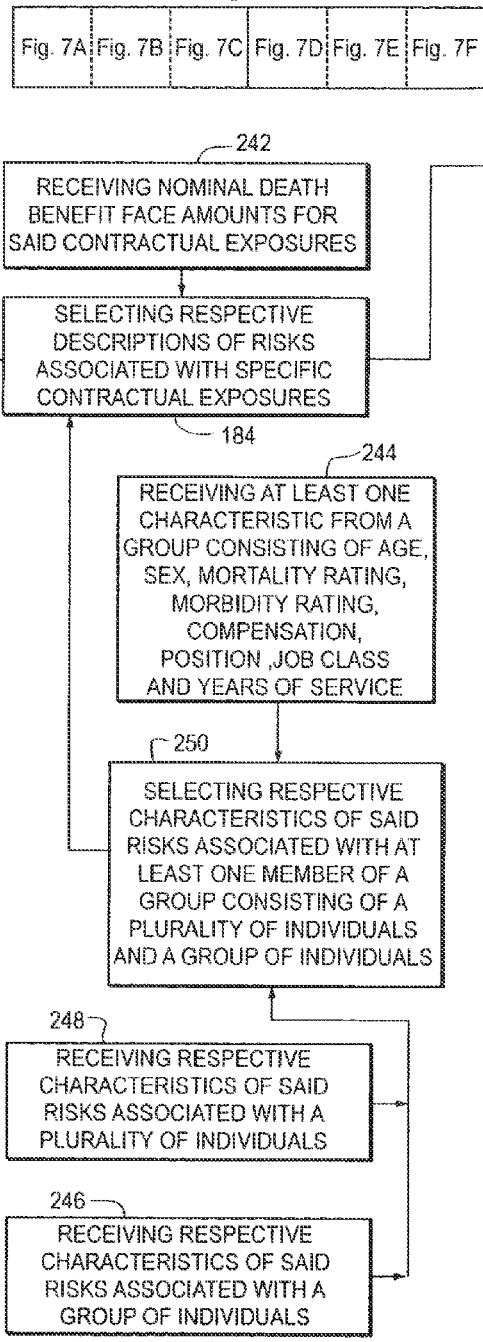

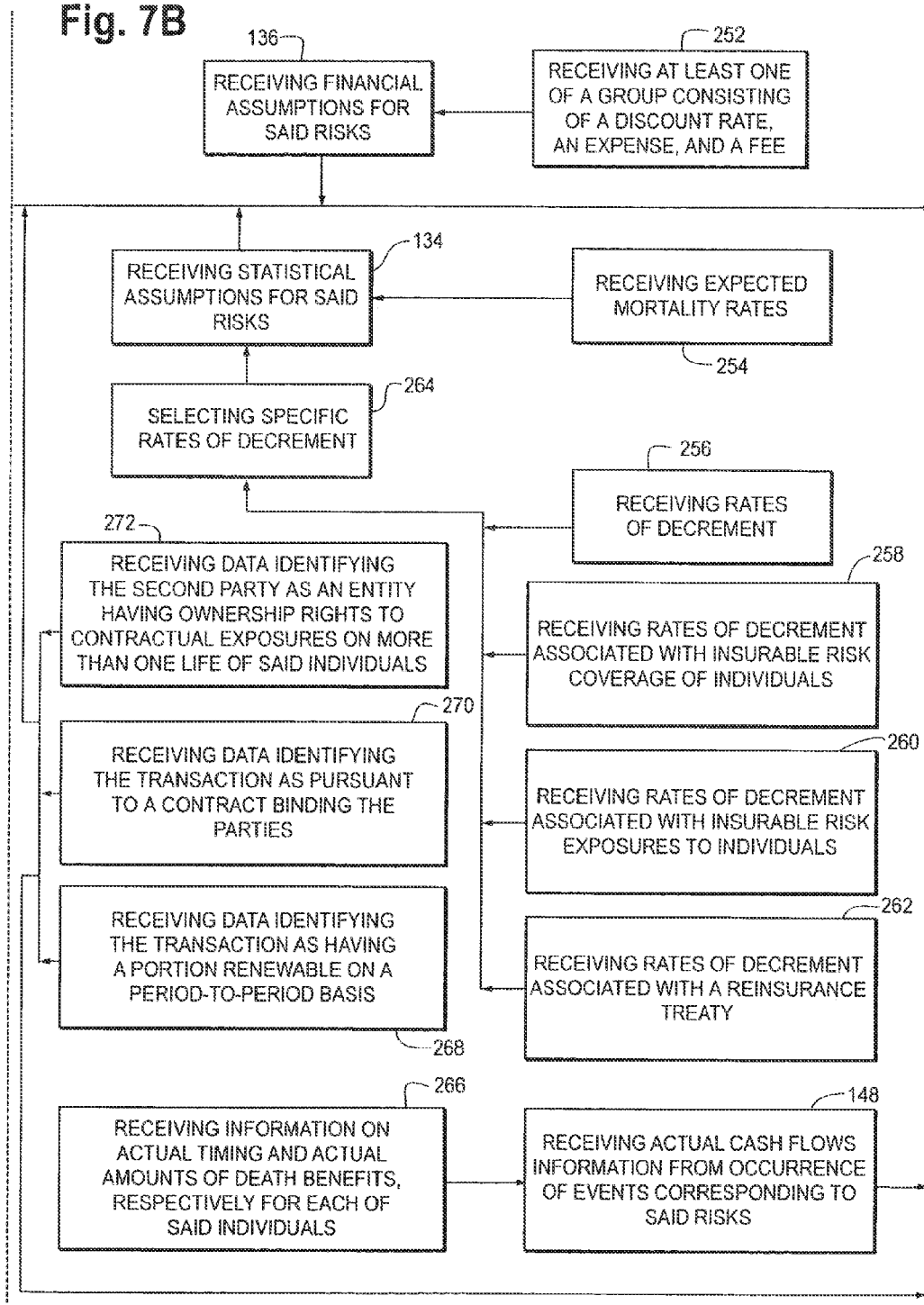

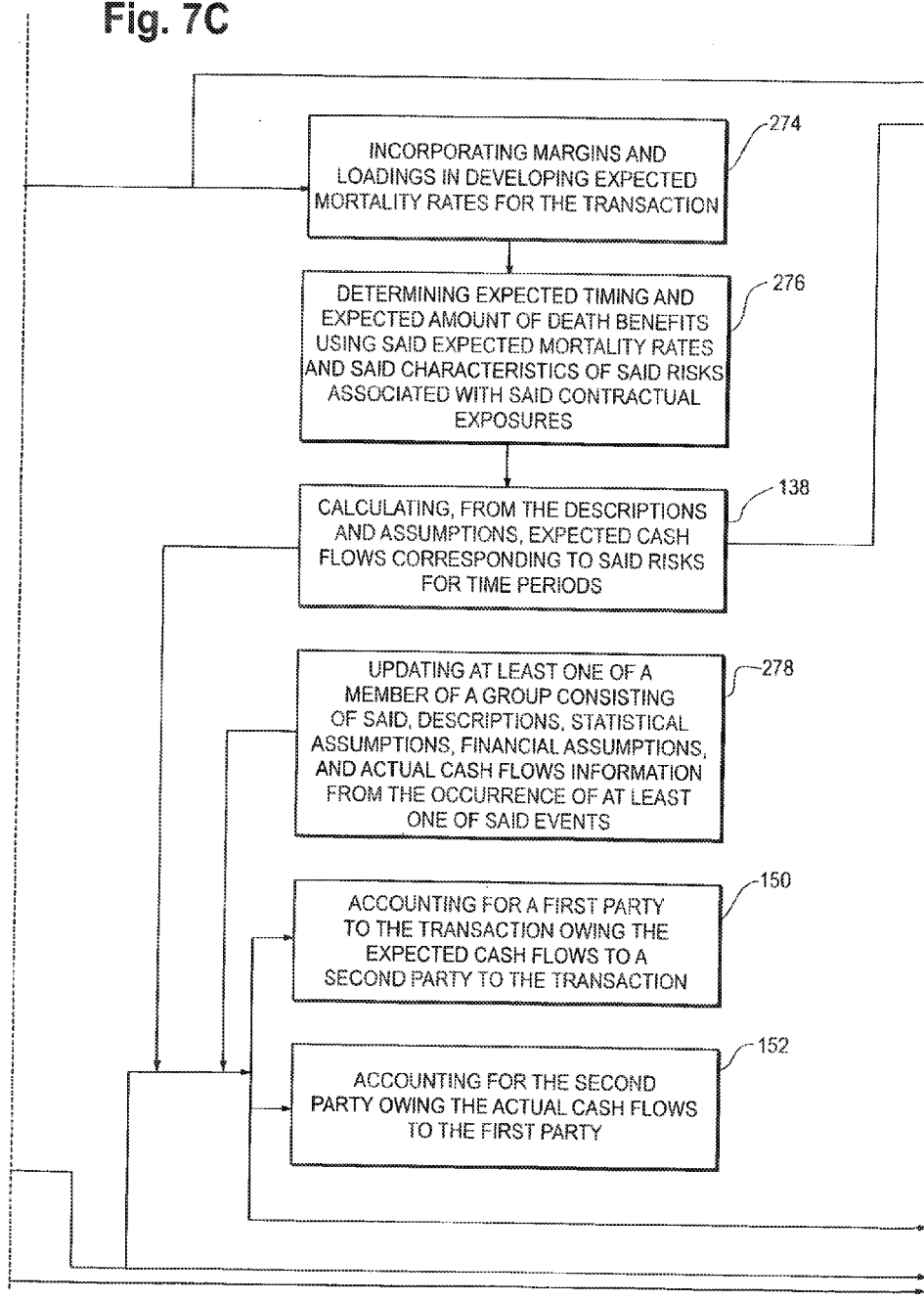

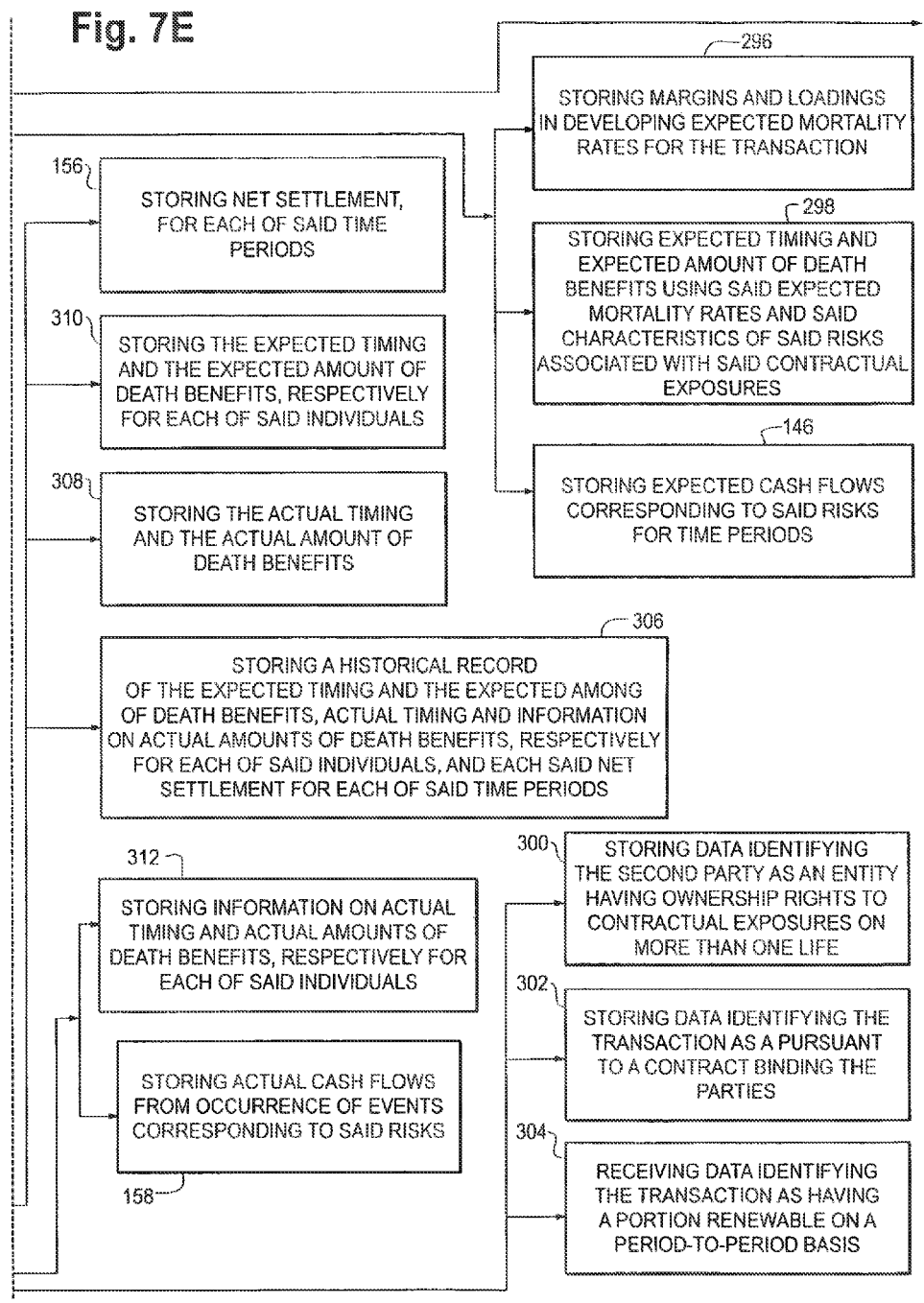

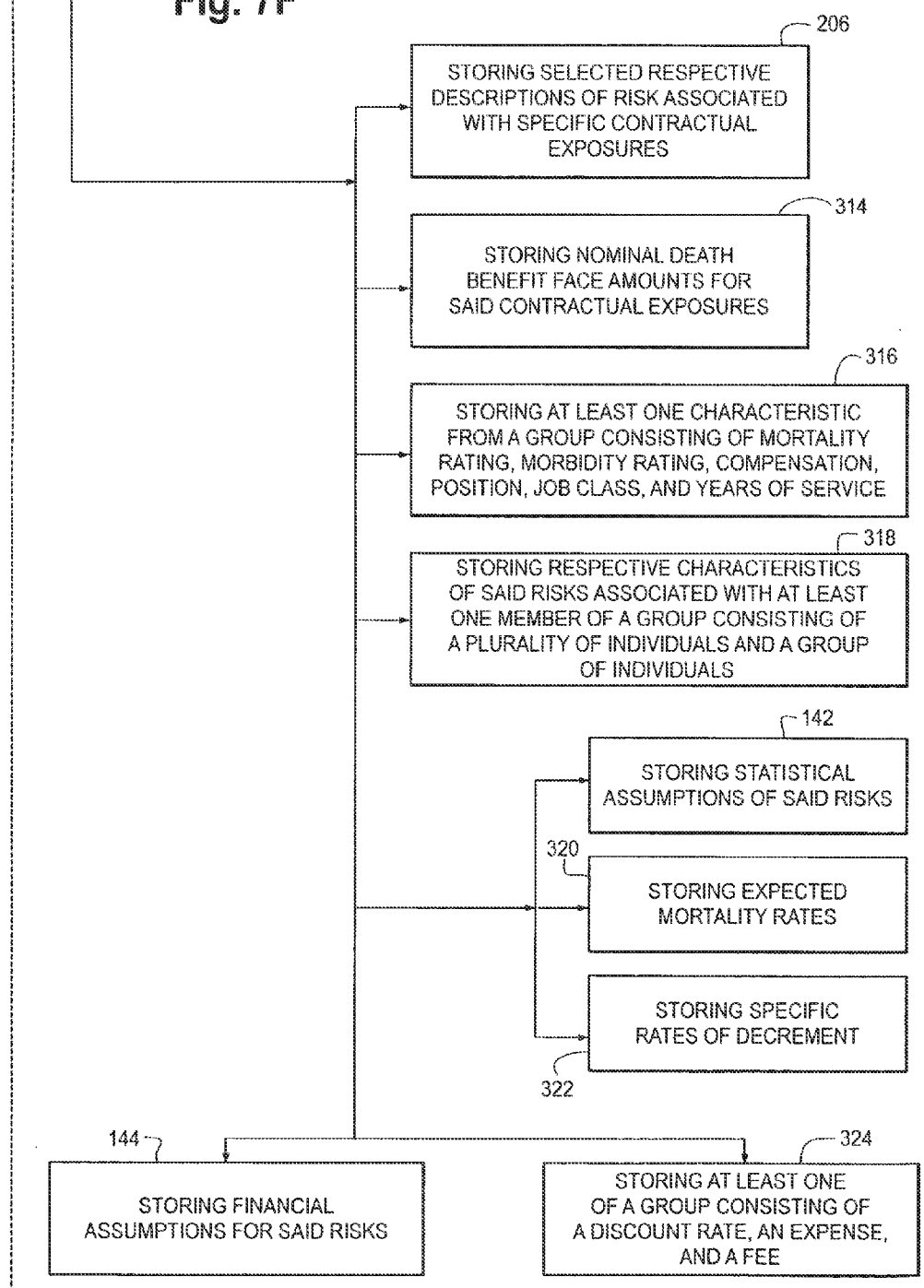

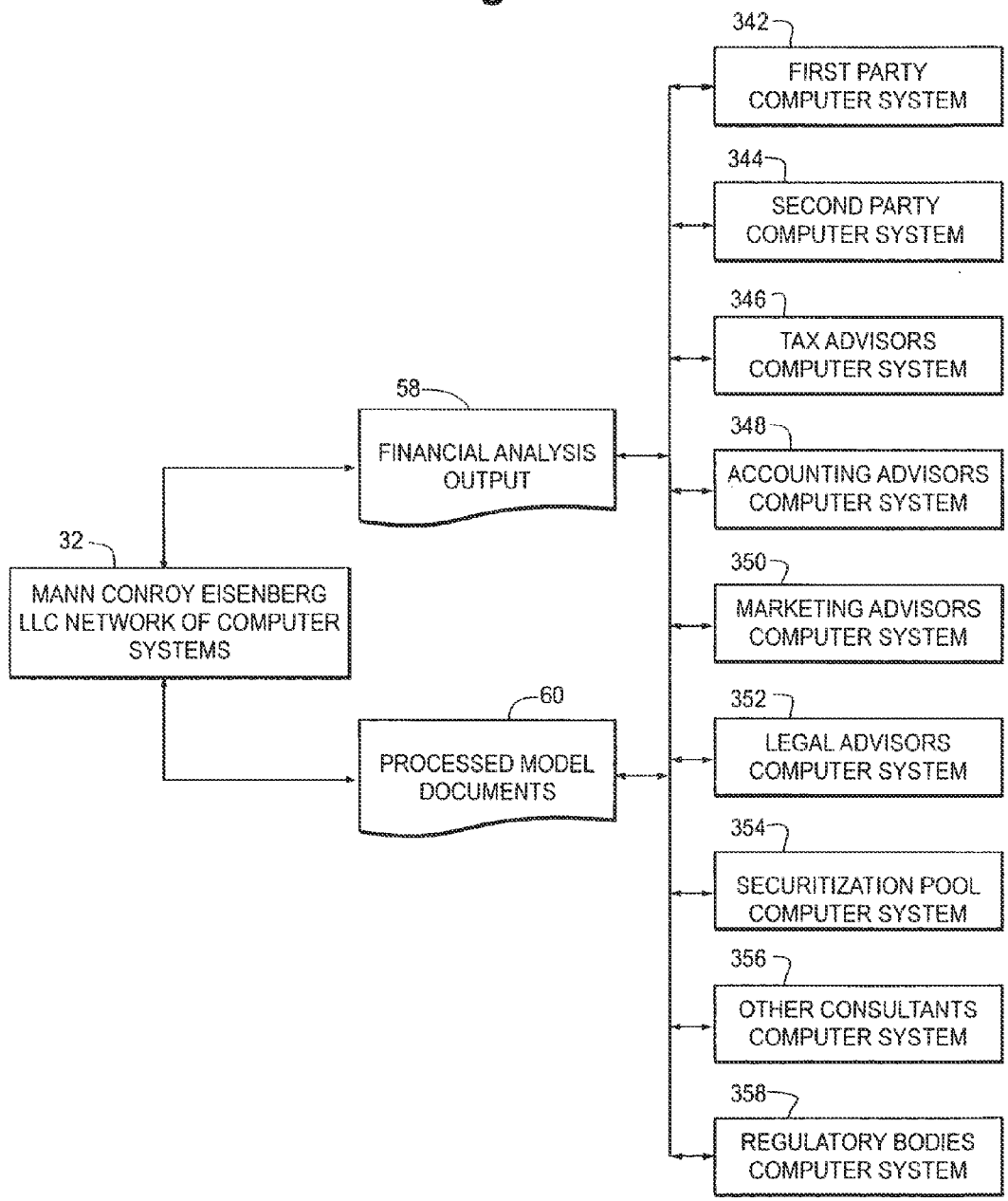

US 8,538,867 B1

FINANCIAL TRANSACTION SYSTEM

I. PRIORITY STATEMENT

The present patent application is a continuation-in-part of, and incorporates by reference as if set out herein, Ser. No. 10/687,063, filed Oct. 16, 2003, issued as U.S. Pat. No. 7,558, 757 on Jul. 7, 2009; Ser. No. 10/839,068, filed May 5, 2004, issued as U.S. Pat. No. 7,792,729 on Sep. 7, 2010; Ser. No. 11/341,735, filed Jan. 27, 2006, abandoned; Ser. No. 11/355,442, filed Feb. 16, 2006, abandoned; Ser. No. 11/828, 954, filed Jul. 26, 2007, abandoned; Ser. No. 11/847,241, filed Aug. 29, 2007, pending. Ser. No. 10/687,063, filed Oct. 16, 2003, issued as U.S. Pat. No. 7,558,757 on Jul. 7, 2009, claims benefit of Ser. No. 60/446,811, filed on Feb. 12, 2003. Ser. No. 10/839,068, filed May 5, 2004, issued as U.S. Pat. No. 7,792,729 on Sep. 7, 2010, claims benefit of Ser. No. 60/468,284, filed May 5, 2003. Ser. No. 11/355,442, filed Feb. 16, 2006, is a continuation of Ser. No. 11/341,735, filed Jan. 27, 2006, now abandoned. Ser. No. 11/828,954, filed Jul. 26, 2007, claims benefit of Ser. No. 60/833,334, filed Jul. 26, 2006, now expired. Ser. No. 11/847,241, filed Aug. 29, 2007, claims benefit of Ser. No. 60/841,102, filed Aug. 29, 2006, now expired.

The present application incorporates by reference as if set out herein: Ser. No. 60/446,811 filed 12 Feb. 2003; Ser. No. 60/468,284 filed May 5, 2003; Ser. No. 60/517,180 filed 4 Nov. 2003; Ser. No. 10/839,068 filed 5 May 2004; Ser. No. 60/603,608 filed 23 Aug. 2004; Ser. No. 11/341,735 filed 27 Jan. 2006; Ser. No. 11/355,442 filed 16 Feb. 2006; Ser. No. 60/833,334 filed 26 Jul. 2006; Ser. No. 11/828,954 filed 26 Jul. 2007; Ser. No. 11/847,241 filed 29 Aug. 2007; Ser. No. PCT/US04/14082 filed 4 May 2004 titled "Computer Support for Multi-jurisdictional Investment"; Ser. No. PCT/US04/32640 filed 1 Oct. 2004 titled "Computer System for Controlling a System of Managing Fluctuating Cash Flows"; Ser. No. PCT/US04/37000 filed 4 Nov. 2004 and titled "Computer System Managing an Insurance Reserve Requirement by Segmenting Risk Components in a Reinsurance Transaction"; Ser. No. PCT/US04/40618 filed 6 Dec. 2004 and titled "Computer System Managing an Insurance Reserve Requirement by Segmenting Risk Components in a Reinsurance Transaction"; Ser. No. 10/581,419 filed 14 Nov. 2006 titled "Computer System Managing an Insurance Reserve Requirement by Segmenting Risk Components in a Reinsurance Transaction" ("Segmenting Risk"); Ser. No. 10/569,987 filed 16 Nov. 2006 titled "Computer System for Controlling a System of Managing Fluctuating Cash Flows"; Ser. No. 10/555,801 filed 9 Jan. 2007 and titled "Computer Support for Multi-jurisdictional Investment"; Ser. No. PCT/US07/74501 filed 26 Jul. 2007 and titled "Computer System"; and Ser. No. 11/574,179 filed 15 Oct. 2007 and titled "Computer System Managing an Insurance Reserve Requirement by Segmenting Risk Components in a Reinsurance Transaction".

II. BACKGROUND OF THE INVENTION

A. Technical Field of the Invention

The present invention pertains to machine, manufacture, process, composition, and product produced thereby, as well as necessary intermediates.

III. BRIEF DESCRIPTION OF THE DRAWINGS

FIG. 4 is a flowchart showing the data input, computational and other logic, and the data output of the logic means for controlling the computer system in accordance with the invention.

FIG. 5 shows a combination of FIGS. 5a-5C.

FIG. 5a, which continues through FIG. 5c, represents a portion of a flowchart showing the data input, computational and other logic, and the data output of the logic means for controlling the computer system in accordance with the invention as applied to an exchange of contractual exposures from insurable risks.

FIG. 5b is a continuation of FIG. 5a, and represents a portion of a flowchart showing the data input, computational and other logic, and the data output of the logic means for controlling the computer system in accordance with the invention as applied to an exchange of contractual exposures from insurable risks.

FIG. 5c is a continuation of FIG. 5b, and represents a portion of a flowchart showing the data input, computational and other logic, and the data output of the logic means for controlling the computer system in accordance with the invention as applied to an exchange of contractual exposures from insurable risks.

FIG. 6 shows a combination of FIGS. 6a-6c.

FIG. 6a, which continues through FIG. 6c, represents a portion of a flowchart showing the data input, computational and other logic, and the data output of the logic means for controlling the computer system in accordance with the invention as applied to securitizing funding for the contractual exposures.

FIG. 6b is a continuation of FIG. 6a, and represents a portion of a flowchart showing the data input, computational and other logic, and the data output of the logic means for controlling the computer system in accordance with the invention as applied to securitizing funding for the contractual exposures.

FIG. 6c is a continuation of FIG. 6b, and represents a portion of a flowchart showing the data input, computational and other logic, and the data output of the logic means for controlling the computer system in accordance with the invention as applied to securitizing funding for the contractual exposures.

Figure 7D:
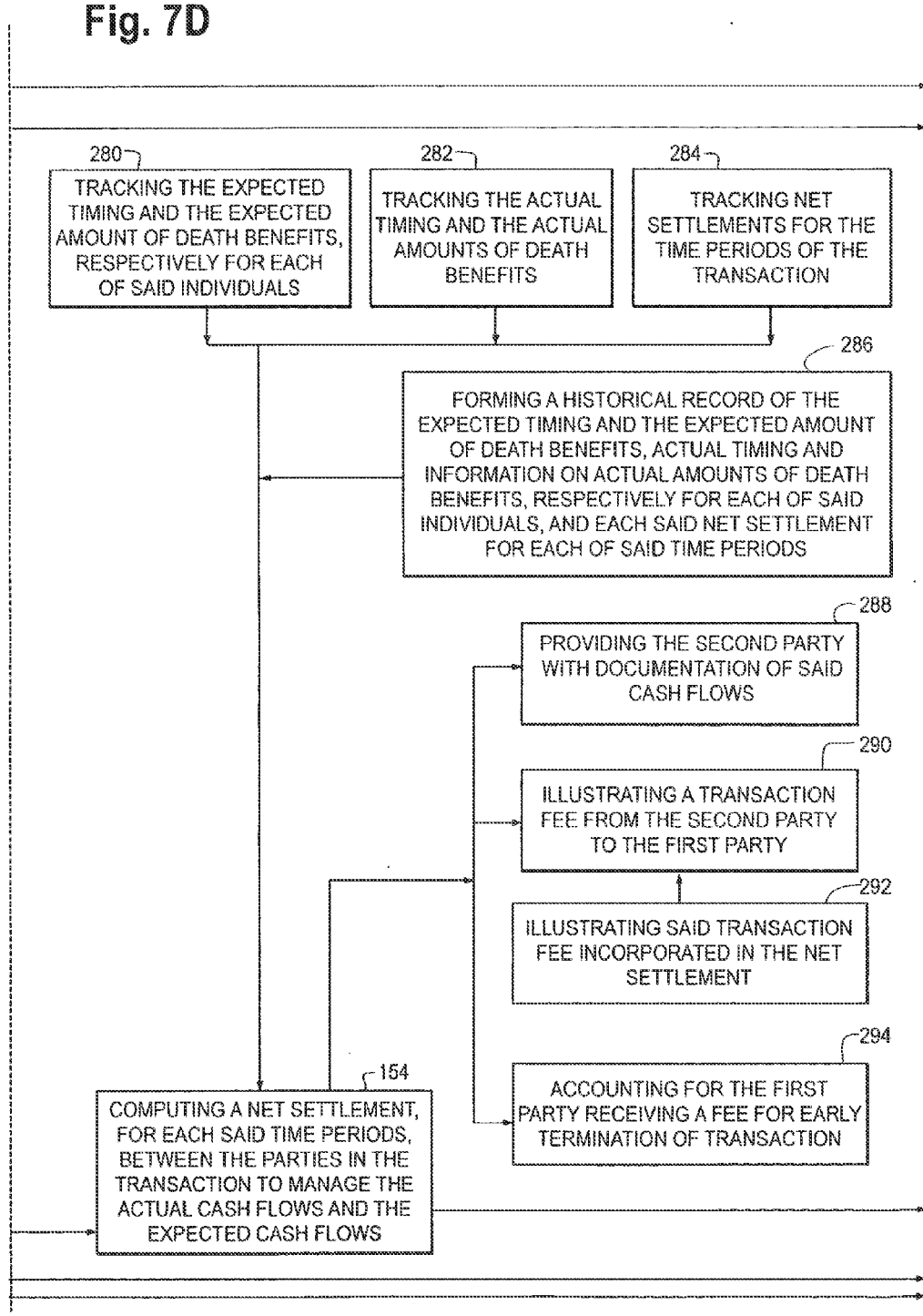

FIG. 7 shows a combination of FIGS. 7a-7f.

FIG. 7a, which continues through FIG. 7f, represents a portion of a flowchart showing the data input, computational and other logic, and the data output of the logic means for controlling the computer system in accordance with the invention as applied to contractual exposures.

FIG. 7b is a continuation of FIG. 7a and represents a portion of a flowchart showing the data input, computational and other logic, and the data output of the logic means for controlling the computer system in accordance with the invention as applied to contractual exposures.

FIG. 7c is a continuation of FIG. 7b and represents a portion of a flowchart showing the data input, computational and other logic, and the data output of the logic means for controlling the computer system in accordance with the invention as applied to contractual exposures.

FIG. 7d is a continuation of FIG. 7c and represents a portion of a flowchart showing the data input, computational and other logic, and the data output of the logic means for controlling the computer system in accordance with the invention as applied to contractual exposures.

FIG. 7e is a continuation of FIG. 7d and represents a portion of a flowchart showing the data input, computational and other logic, and the data output of the logic means for controlling the computer system in accordance with the invention as applied to contractual exposures.

FIG. 7f is a continuation of FIG. 7e and represents a portion of a flowchart showing the data input, computational and other logic, and the data output of the logic means for controlling the computer system in accordance with the invention as applied to contractual exposures.

FIG. 8 is a graphic representation of interrelated computer systems in accordance with the invention.

Figure 9:
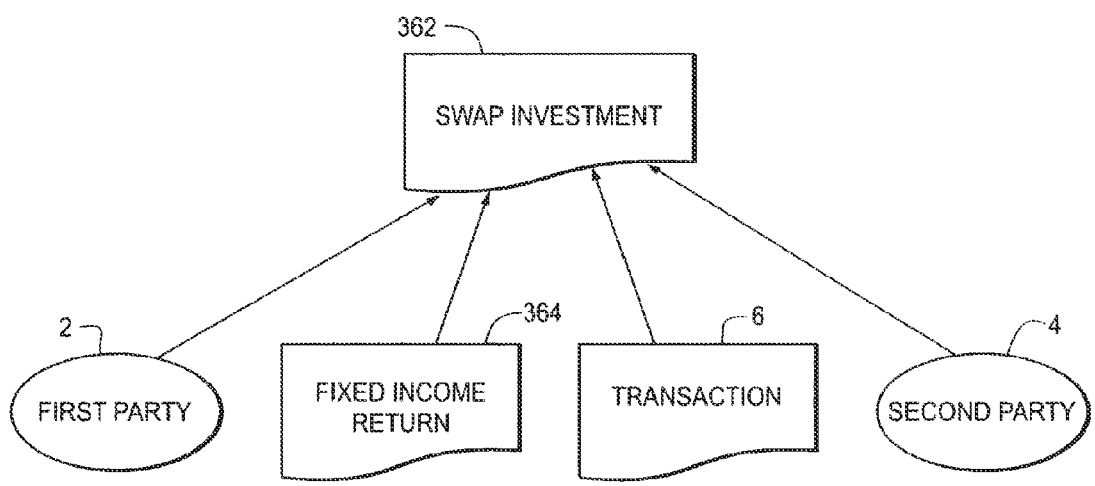

FIG. 9 is an illustration summarizing the embodiment of the invention as a swap security.

IV. DETAILED DESCRIPTION

Consider carrying forward each of the applications from which priority and incorporation by reference has been set out above, and using the information in those applications incorporation by reference, as well as improvements on any and all of the foregoing.

With respect to embodiments which include a combination, note that the any combination of any of the embodiments in Cash Flows, Redundant Reserve, Multi-jurisdiction, and Segmenting Risk, can be combined (improved or as previously disclosed). For example, a Cash Flows embodiment can be used in connection with a Multi-Jurisdictional placement, with insurance using the Redundant Reserve and Segmenting Risk embodiments. Likewise, a Redundant Reserve embodiment could be used in combination with, say, a Segmenting Risk embodiment and/or a Multi-jurisdictional embodiment, etc., for any combination of any of the embodiments in Cash Flows, Redundant Reserve, Multi-jurisdiction, and Segmenting Risk. The computer systems (process, product, machine, manufacture) can be distinct, consolidated, or can be a combination thereof, as may be preferred for a particular application desired.

As used herein, the term "computer" generally refers to hardware or hardware in combination with one or more program(s), such as can be implemented in software. Computers can be implemented as general-purpose computers, specialized devices, or a combination of general-purpose and specialized computing devices. Computing devices can be implemented electrically, optically, quantumly, biologically, and/or mechanically or in any combination of these technologies. A computer as used herein can be viewed as at least one computer having all functionality or as multiple computers with functionality separated to collectively cooperate to bring about the functionality. This includes single processor and multi-processor implementations of a computer. A processor can include any device that processes information or executes instructions. Computer logic flow and operations can be used in processing devices, including but not limited to: signal processors, data processors, microprocessors, and communication processors. Logic flow can be implemented in discrete circuits, combinational logic, ASICs, FPGAs, reconfigurable logic, programmed computers, or an equivalent.

Computer-readable media or medium, as used herein, includes any technology that includes a characteristic of memory. Memory technologies can be implemented using magnetic, optical, mechanical, or biological characteristics of materials. Common examples of memory are RAM, ROM, PROM, EPROM, FPGA, and floppy or hard disks. Communications medium or connection, as used herein, is any pathway or conduit in which information can be communicated or exchanged. The pathway or conduit can be wired, optical, fluidic, acoustic, wireless, or any combination of the foregoing.

The computer system can include one or more computers, which illustratively can be PC systems or server systems, and any combination of the foregoing. Depending on the implementation, computers can be adapted to communicate among themselves, or over a network such as the Internet. Programs, as used herein, are instructions that when executed by a processing device causes the processor to perform specified operations. Programs can be written in various languages, including but not limited to assembly, COBOL, FORTRAN, BASIC, C, C++, or Java. Languages can be object oriented like C++ and Java, for example. The programming language can be interpretive or compiled, or a combination of both. The programs are usually processed by a computing system having an operating system. An operating system can be processor specific, like an RTOS (real time operating system) used in cell phones, or commercial like OSX, UNIX, Windows, or LINUX. An operating system or program can be hardwired, firmware, reside in memory or be implemented in an FPGA or reconfigurable logic.

For example, a computer system can comprise a computer (e.g., an IBM, Hewlett Packard, MAC, or other personal computer) with one or more processors (e.g., an Intel or AMD series processor or the like), a memory (e.g., RAM, a hard drive, disk drive, etc.), one or more input devices (e.g., keyboard, mouse, modem, or the like), and one or more output devices (e.g., a modem, a Hewlett Packard printer, a Dell monitor, or other such output device). Note that the modem is representative of a computer-to-computer communication device that can operate as an input/output device. To provide other illustrative embodiments, the computer system can comprise at least one of a desktop computer, a telephonic device, a console, a laptop computer, and a mobile communication device. The mobile communication device can comprise at least one of a cellular telephone, laptop, a PDA, and an IPhone-type device. Communications between devices may be wired, for example cabled Ethernet based home or office network, wireless through IEEE 802.11a/b/g network cards or Bluetooth, or optical through an IR port. Networking between devices may be through WANs, LANs, Intranets, Internet or peer-to-peer arrangements, or in a combination of them. Networks may include, for example, gateways, routers, bridges, switches, front end and back end servers, IPS (Internet service providers), content provider servers, scanners, copiers, printers and user computing devices. Devices on the network may include interfaces that can be as simple, such as a keyboard with an LCD screen, or can be complex, such as a web interface. Web interfaces are presented in a web browser environment. Web browsers render XML or HTML containing pictures and links in a window on the desktop, for example like Windows XP. Firefox, Monzilla, Internet Explorer, and Safari are examples of well known web browsers.

Illustratively, but definitely not in a limiting way, commence consideration with respect to Cash Flows: it has been said that corporations routinely purchase corporate-owned life insurance (COLI)/bank-owned life insurance (BOLI) contracts, the Policies, on employees, Covered Persons, in whom the corporation has an insurable interest. In many cases, these policies are purchased as funding vehicles to offset specific future corporate liabilities (e.g., deferred compensation plans). Because the policies pay death benefits upon the deaths of corporate employees, the corporations may have concerns regarding the potential deviation of the receipt of death benefits from the expected timing of such receipts, resulting in a mismatch of the cash flow derived from the COLI/BOLI contracts and the funding needs of the associated future liabilities.

In the life insurance industry, reinsurance is an important risk management tool. It is a contractual risk transfer that usually involves mortality risk transfer. It is a tool for ceding insurance companies to smooth out fluctuations in earnings which are usually heavily dependent on actual mortality results. The ceding insurance company has future actual mortality liability and wants certainty. The ceding company pays expected mortality plus costs in exchange for receipt of actual mortality.

In the financial sector, it is not uncommon that property & casualty (P&C) insurance derivatives are traded that swaps actual results for expected results using generic benefit index applicable to segments of the market.

What about entities, that own future actual mortality cash flows and want to eliminate the uncertainty in the timing and in the amount of these cash flows, for example, employers using BOLI/COLI as funding vehicles for future liabilities, securitization programs for life insurance funding such as charity, and any other organization that requires more predictable cash flows. There are corporations that are logical counterparties to these entities, such as, life reinsurers and large well funded Defined Benefit Pension Plans, where the life insurance risks taken on the swap would be general hedges against their current life reinsurance portfolio and their longevity risks, respectively.

Mortality and other benefit occurrences (such as disability [which includes health] or longevity) vary so much from one case to another that the generic benefit index pricing used in the P&C insurance derivatives is not sufficient to price the associated risks effectively.

With respect to Cash Flows, it has also been said that, in general, events, measurable by statistical or actuarial projections or probabilities, that fluctuate in timing and/or amount, where such events are uncontrolled by the parties, can produce irregular financial results. A SWAP, or the like, serves to add certainty to financial results for one party by shifting variable or irregular financial results to another party.

For example, this approach can be used to manage insurance policy death proceeds arising from a group of insureds and smooth out or regularize cash flows from the proceeds. The invention can be used in other applications, but this example is particularly instructive for understanding the nature of the invention and computer support therefore.

To carry out this approach, a financial derivative can be structured as a "Swap", similar to a Credit derivative. It can also be embedded into other financial instruments, for example, Bonds and Stocks. The policy beneficiary/owner (or another party with a beneficial interest in the policies, such as a charity) could enter a "Swap" contract with counterparty and would "Swap" actual mortality or other cash flows for the related expected cash flows. The policy beneficiary/owner would receive "Expected Mortality" or other "expected cash flow(s)" in exchange for "Actual Mortality" or other "actual cash flow(s)." The "Swap" terms could have to be specific to the underlying plan, program, and policies as mortality and other benefit occurrences vary so much from case to case. The analysis for development of these terms is included as part of this invention. A generic benefit index may not be readily developable to build a "generic" product similar to the traded P&C insurance derivatives. Too much "basis risk" could exist, making the product unattractive. Accordingly, pure expected cash flows could be developed consistent with the underlying program from stochastically modeled actual cash flows reflecting the relationship embodied in the exchange—symmetric proportional or nonproportional or asymmetric proportional and nonproportional—and applied to the program's actual experience.

The counterparty's fees would be either explicit in the purchase price or incorporated in the "Expected Cash Flow" rates. The fee could be a one-time fee, or, more likely, a periodic fee. The swap could normally require mandatory renewal, e.g., except in the case where the underlying program has been terminated, in which case there would most likely be some sort of settlement. The term of the product could be, say, 30 years, with a memo account tracking experience, with a settlement, should the plan of insurance be cut short. Expected Mortality rates paid could be based on the underlying policies, similar to rate setting for yearly renewable term (YRT) reinsurance treaties, so expected and actual cash flow(s) could be based on the makeup of the plan.

The counterparty could be either a disinterested third party or the original insurer issuing the product to the plan, or the reinsurer providing reinsurance cover to the original insurer, or all of the above. Whether or not the "Swap" qualifies as a "Hedge" under the IRC can be controlled, if desired. Also, a portion of the mortality risk, say the first $25,000 per life, could be left with the Policy Beneficiary/Owner (similar to "Excess Retention" reinsurance), if desired.

The transaction can be carried out with computer support, even including communications and documentation. For example, an insurance company receives premiums and pays benefits under policies sold to policy holders. A policy holder enters into a swap agreement with counterparty. Periodically, the counterparty and the policy holder calculate the actual benefits minus expected benefits to form a result. If the result is positive, policy holder pays counterparty, more or less, the result. If the result is negative, counterparty pays policy holder, more or less, the absolute value of the result. The calculation is performed for each period, however in certain cases, one side to the settlement may have been paid in advance or may be deferred to the future by contract. In these cases the net settlement calculation will be adjusted for the prepayment or deferral.

These and other objects and/or advantages improve over the prior art as can be appreciated from the more detailed discussion of the invention that follows.

However, it should be noted that this approach can otherwise be used to smooth out or regularize cash flows. Now consider the following discussion of the Figures.

Figure 1:
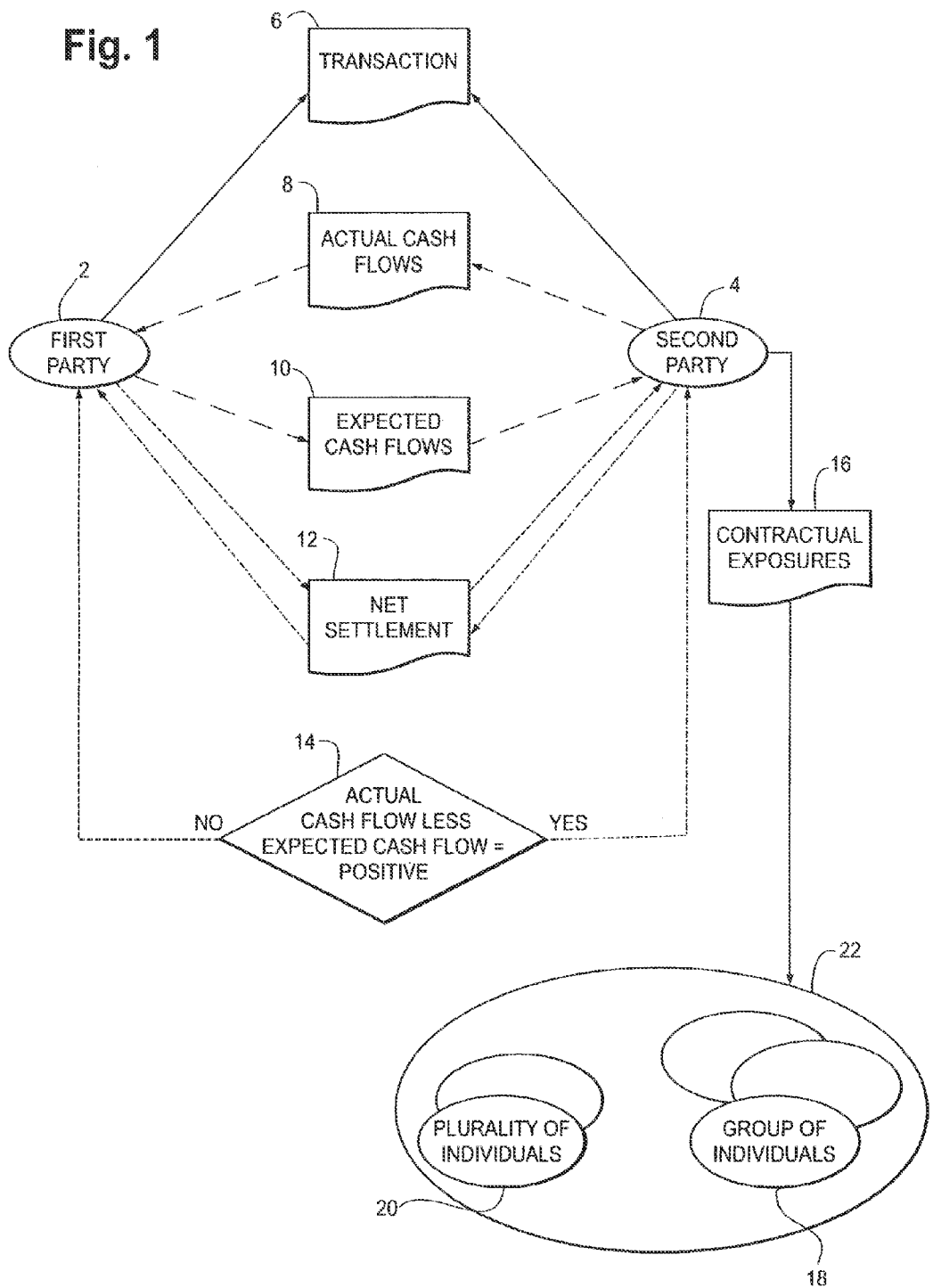
FIG. 1 is a graphic representation of a transaction for managing fluctuating cash flows.

FIG. 1 illustrates the nature of the financial innovation that gives rise to the need for the computer system and methods of the present invention. Corporations have contractual exposures, for example with respect to benefit payments, to individuals or to groups of individuals. Insurance or reinsurance contracts obtained by these corporations provide actual cash flows upon the occurrence of certain contingent events specified in the contracts. A contingent event could be death, disability (which includes health), or survivorship. The financial innovation of the present invention allows for (1) the exchange of these actual cash flows for expected cash flows, with respect to amount and timing, associated with these contractual exposures, (2) the regular settlement of the net of the actual and the expected cash flows from and to the corporation, and (3) the participation for consideration of a counterparty to the corporation.

A Second Party 4, usually a corporation, is subject to Contractual Exposures 16 of benefit payments to Plurality of Individuals 20. (Similarly, Second Party 4 could be subject to corporate Contractual Exposures 16 of benefit payments to a Group of Individuals 18. The Contractual Exposures 16 could be for risks associated with a member of a group, Block 22, consisting of Plurality of Individuals 20 and Group of Individuals 18). Second Party 4 usually contracts with an insurance or reinsurance company for these contractual exposures and receives actual cash flows upon occurrence of contingent events with respect to Plurality of Individuals 20 or Group of Individuals 18. There is no certainty to the timing and amount of actual cash flows. The financial innovation describes the Computer System 32 (see FIG. 2) and the methods for a Transaction 6 (in the nature of an exchange or a swap of expected results for actual results) between a First Party 2 (another party or a counter party, usually a reinsurer, another corporation, trust or individual) and the Second Party 4. This Transaction 6 enables Second Party 4 to manage, with respect to timing and amount, fluctuations of actual cash flows resulting from said Contractual Exposures 6. Second Party 4 would be accountable for Actual Cash Flows 8 to First Party 2 while First Party 2 would be accountable for Expected Cash Flows 10 to Second Party 4. A Net Settlement 12 of cash flows between First Party 2 and Second Party 4 occurs on a regular basis.

Figure 2:
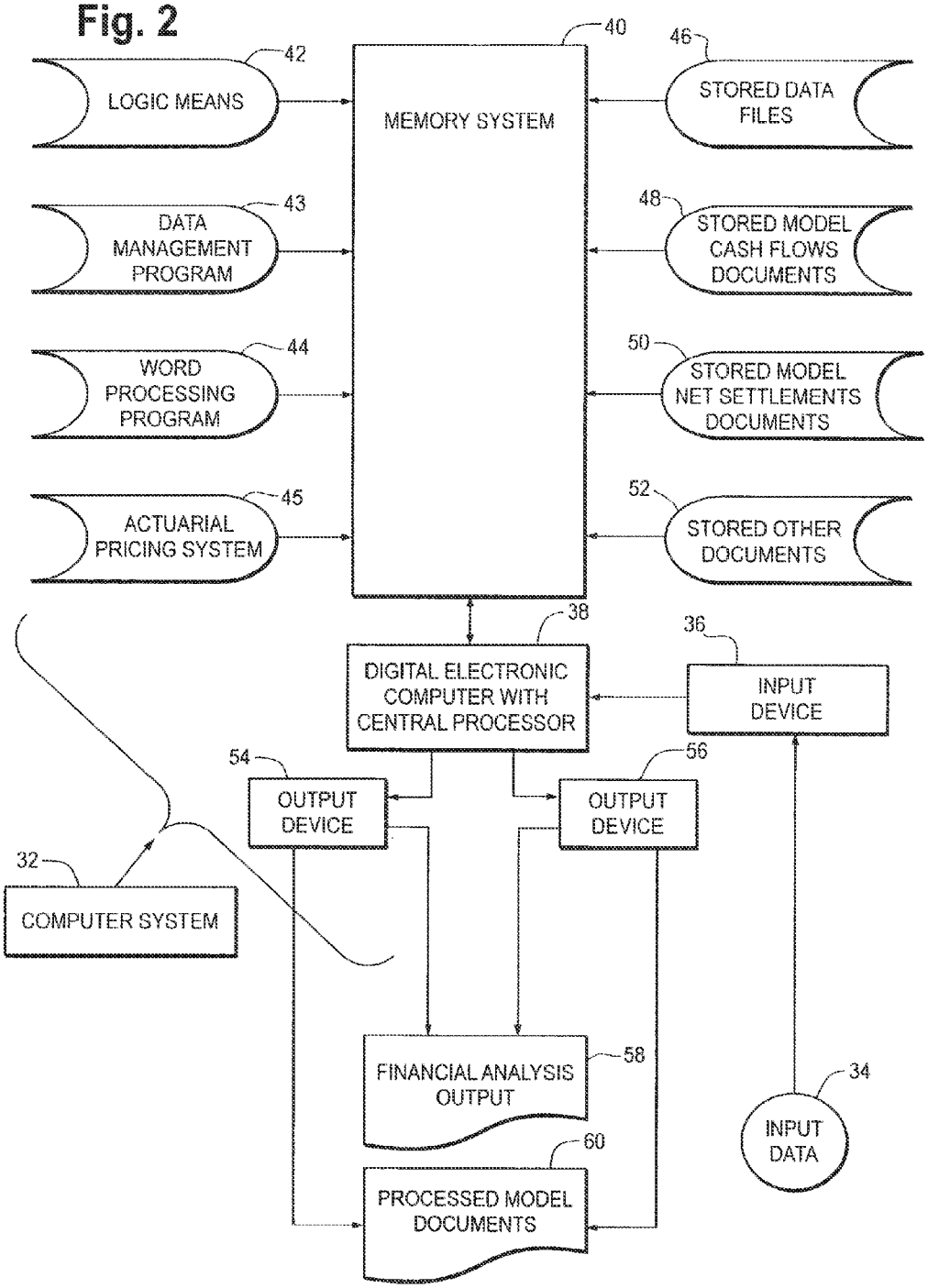
FIG. 2 is a diagram representing the computer system in accordance with the invention.

FIG. 2 provides a graphic presentation of the computer system for managing fluctuating cash flows. The present invention is directed to a Computer System 32 (i) that manipulates digital electrical signals consisting of (a) Input Data 34 pertaining to the Contractual Exposures 16, (b) model documents including Stored Model Cash Flows Documents 48, Stored Model Net Settlements Documents 50 and Stored Other Documents 52, and (c) previously encoded and processed data Stored Data Files 46; (ii) that transforms these signals into analyses of the data and assumptions; (iii) that uses these transaction specific data and assumptions and price each transaction separately; (iv) that documents the results in Financial Analysis Output 58, and (v) that illustrates selected results in Processed Model Documents 60.

The Computer System 32 includes a Digital Electronic Computer with Central Processor 38, a Memory System 40, an Input Device 36, and preferably two output devices, Output Device 54 and Output Device 56. The Memory System 40 includes an operating system Logic Means 42 to run the Computer System 32 and applications software. For example, the operating system could be Microsoft XP Professional that would allow use of (a) its applications software such as Microsoft EXCEL, ACCESS, and WORD, and (b) actuarial pricing systems compatible with Microsoft XP Professional such as AXIS, TAS, or PROPHET. The Memory System 40 includes (a) a Word Processing Program 44 such as Microsoft Word to generate Processed Model Documents 60 using data, assumptions, and results, (b) a Data Management Program 43 such as Microsoft EXCEL or ACCESS to manage and evaluate data files, and (c) an Actuarial Pricing System 45 such as AXIS, TAS or PROPHET that access data files and assumptions and generates pricing results. The Input Device 36 such as a keyboard receives Input Data 34 either manually or electronically. Output Device 54 and Output Device 56, such as a printer or a CD drive; produce such relevant documents as the Financial Analysis Output 58. Financial Analysis Output 58, including the input data, processed results, statistical and financial assumptions, and other relevant information as well as processing logic, is normally shared via a network of computers as indicated in FIG. 8 (Computer System 32, and computer systems, Blocks 342-358, of parties involved such as First Party, Second Party, Tax Advisors, Accounting Advisors, Marketing Advisors, Legal Advisors, Securitization Pool, Other Consultants and Regulatory Bodies) and technical discussions occur until desired results are processed and illustrated formally in Processed Model Documents 60.

Input data 34, usually in the form of files, includes:
List of the lives associated with the contractual exposures, identified by codes and including an identification of whether the contractual exposures are on individual lives or a group of lives;
Characteristics of the risks associated with these lives, at least one of, sex, age, mortality rating, morbidity rating, compensation, position, job class and years of service;
Rates of decrement (in the form of statistical assumptions such as mortality rates) associated with these lives as per the Contractual Exposures 16;
Financial assumptions, at least one of, discount rate, expense and fee;
Updates to above;
Pricing assumptions, and any updates;
Actual cash flows, timing and amount, per life (or group of lives);
Transaction data including:
Legal name of First Party 2;
Legal name of Second Party 4;
Effective date of the transaction;
Duration of the transaction and renewability options;
Transaction fee, which could be a single fee or an annual fee incorporated in the regular net settlement; and
Other fees, at least an early termination fee.
Processed data includes:
Expected rates of decrement, and any updates;
Expected cash flows, timing and amount, per life (or group of lives), per regular time period;
Actual cash flows, timing and amount, per life (or group of lives), per regular time period;
Net settlement, per regular time period, illustrating separately transaction fee and other fees; and
Comparative, year-to-date and historical versions of the above data.

Figure 3:
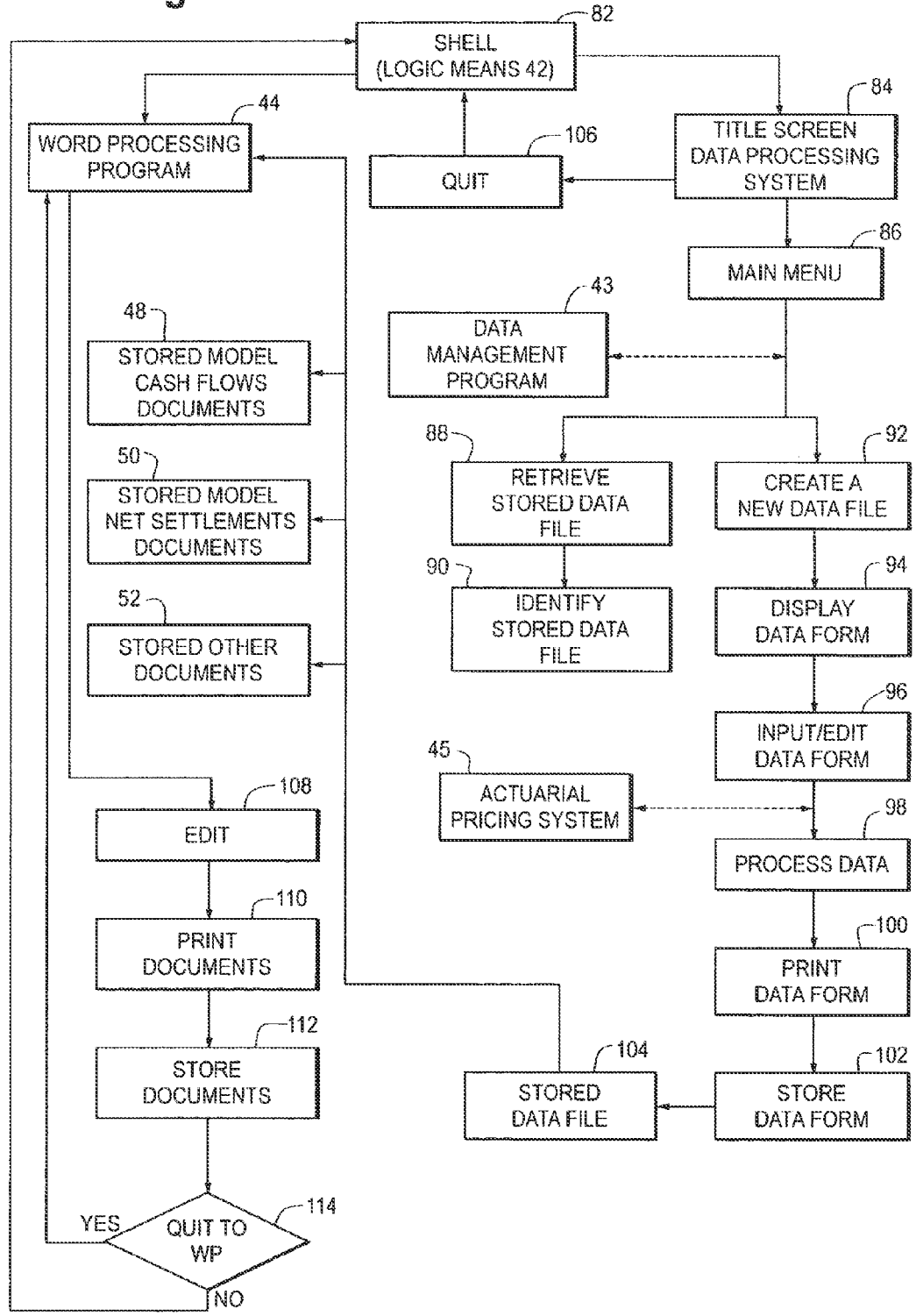
FIG. 3 is a flowchart showing the logic of the logic means for controlling the computer system in accordance with the invention.

FIG. 3 is a flowchart of the overall operational processes for Computer System 32 (see FIG. 2). Shell 82 allows for two pathways, one for processing data, using Title Screen Data Processing System 84, and the other for processing model documents, using Word Processing Program 44.

Title Screen Data Processing System 84 could be a coded or programmed EXCEL application, or similar application software that allows processing of numbers and logical evaluations. Starting with Main Menu 86, that allows for the processing of information for the current invention, and using Data Management Program 43, the system allows for creation of new data file (Block 92) and update of existing data file (Block 88, retrieval of data file and Block 90, identification of data file); then display (Block 94) and input/edit (Block 96) of data form. Using Actuarial Pricing System 45, the system allows for the processing (Block 98) of these data files. This pricing system generates multiple scenario results used for pricing evaluation and then the final results for the specific transaction. Using Data Management Program 43 (see FIG. 2) data information is printed (Block 100), data form (Block 102) is stored, and data file (Block 104) is stored. Using Word Processing Program 44, model cash flows documents, model net settlements documents and other documents are stored as per Blocks 48-52. Data files are maintained historically, per contract, from its effective date. Data storage is physically in the computer or in a computer readable file kept offsite. As defined in detail above, data includes statistical assumptions, financial assumptions, respective descriptions of risks, pricing data, expected cash flows corresponding to said risks for time periods for the duration of the contract, actual cash flows information from occurrence of events corresponding to said risks, net settlement for each said time periods between the parties in the transaction, transaction fee and fee for early termination of the contract.

Word Processing Program 44 allows for creating blank model documents (Blocks 48-52, cash flow documents, net settlements documents and other documents), editing existing model documents for any updates (Block 108), printing such results (Block 110) and storing different versions of model documents (Block 112). Model documents showing current results and usually comparative, year-to-date and historical results are also produced regularly. Model documents per regular accounting periods showing actual results, expected results and net settlements are maintained historically per contract.

The Logic Means 42 allows for continuing processing in Blocks 84, 86 and 114 (thru the title screen, main menu and the logic to continue with the word processing program) as well as for finalization of the process thru Blocks 108 and 114 (thru the quit routine in the title screen and the logic to quit with the word processing program).

FIG. 4 shows the logic of the processes in the general embodiment of the current invention. Input data is received starting from the early stages of preparation for the transaction and during regular time periods for the duration of the contract. The process includes Receiving Respective Descriptions of Risks 132, Receiving Statistical Assumptions for Said Risks 134, and Receiving Financial Assumptions for Said Risks 136 in order to perform Calculating Expected Cash Flows 138. The risks refer to the risk parameters, such as age, sex, mortality rating and others, associated with either Plurality of Individuals 20 or Group of Individuals 18 (see FIG. 1), as is appropriate for the Contractual Exposures 16 (see FIG. 1). The statistical assumptions, such as the expected mortality rates, characterize and correspond to the risks associated with the contractual exposures. The financial assumptions reflect the financial terms agreed upon by First Party 2 and Second Party 4 and allow for the calculation of the timing and amount of expected cash flows, and with the pricing data allow for the calculation of the resulting transaction fee and other fee such as fee for early termination. The assumptions are stored by the computer system. From time-to-time, these assumptions are reviewed and revised. Any further discussions are initiated by either First Party 2 or Second Party 4 for any assumption revisions that affect the terms of the transaction. The computer system maintains all relevant data for generating the financial results per regular time period, per year-to-date period, per comparative time periods and historically. Storage off-site is also maintained. Blocks 140-146 and 156-158 allow for the storage of information. These processes include Storing Descriptions of Risks 140, Statistical Assumptions 142, Financial Assumptions 144, Expected Cash Flows 146, Net Settlement 156 and Actual Cash Flows 158.

Receiving Actual Cash Flows Information from Occurrence of Events Corresponding to Said Risks 148 is performed during regular accounting periods and data is provided by Second Party 4. An example of the occurrence of an event is the death of one of Plurality of Individuals 20 and receipt by Second Party 4, from either an insurance company or a reinsurance company, of an actual death benefit increased with interest credited from date of death. Or it could be that the occurrence of the event is a trigger for the contractual payment liability of Second Party 4 (who is contractually liable but is self-insuring the death benefit payment).

The regular processing at said time periods include Accounting for First Party owing Expected Cash Flows to Second Party to the Transaction 150, Accounting for Second Party owing Actual Cash Flows to First Party 152 but only Computing a Net Settlement 154 which becomes the basis of the exchange of moneys between First Party 2 and Second Party 4. The exchange of moneys is accompanied by documents showing actual cash flows, expected cash flows, net settlement, transaction fee and fee for early termination (if appropriate) for the current time period and other agreed-upon comparative or cumulative data. The Processed Model Documents 60 also includes the appropriate transaction details.

FIGS. 5-5c shows the logic of the processes in the embodiment of the current invention as an exchange of contractual exposures from insurable risks. The present invention involves Computer System 32 for managing fluctuating cash flow(s). In general, uncertain events that can be measured using statistical or actuarial methodologies but are not certain in timing and/or amounts, and such events are uncontrolled by the parties, can produce financial results that may vary from expected results. With statistical or actuarial methodologies, expected timing and amounts of cash flows associated with these events can be projected, but actual experience may vary significantly from expected. Certainty of results may be achieved through a SWAP of expected results for actual, either on a "proportional", "non-proportional", "symmetric", or "asymmetric" basis (es), and thus transfers the variations to another party.

For example, this approach can be used to manage insurance policy death proceeds arising from an insured group by adding certainty to the otherwise variable cash flow(s) from the death proceeds. The invention can be used in other applications, but this idea is particularly instructive for understanding computer support therefore.

To carry out this approach, a financial derivative can be structured as a "Swap", similar to a Credit derivative. The policy beneficiary/owner or another party with a beneficial interest in the policies, such as a charity (beneficiary) could enter a "Swap" contract with counterparty and would "Swap" actual mortality or other cash flow(s) for the related expected mortality or other cash flow(s). The counterparty could be either a disinterested or interested third party. The Beneficiary would receive "Expected Mortality" or other "expected cash flow(s)" in exchange for "Actual Mortality" or other "actual cash flow(s)." The "Swap" terms would be specific to the underlying plan, program, and/or policies as expected, as well as actual mortality and other benefit occurrences, vary so much from case to case. A generic benefit index may not be readily developable to build a "generic" product similar to those used in the traded P&C insurance derivatives, as too much "basis risk" could exist. Thus, making the product unattractive.

The swap could normally require mandatory renewal, e.g., except in the case where the underlying program has been terminated, in which case there would most likely be some sort of settlement, since one of the parties may have the ability to control whether or not termination takes place. The term of the product could be, say, 30 years, with a memo account tracking experience, with a settlement, should the plan of insurance be cut short. Whether or not the "Swap" qualifies as a "Hedge" under the Internal Revenue Code or GAAP Accounting Rules or both can be controlled, if desired. Also, a portion of the mortality risk, say the first $25,000 per life, could be left with the Policy Beneficiary/Owner (similar to "Excess Retention" reinsurance), if desired.

Expected Mortality rates paid would be based on the underlying policies, similar to rate setting for YRT reinsurance treaties, so expected and actual cash flow(s) could be based on the makeup of the plan. The expected mortality rates could reflect pure risk mortality rates, margins for contingencies and other loadings such as expenses The expected mortality rates could be periodic rates or could reflect time value of money such as interest and life contingency. The counterparty's fees would be either explicit as a one-time fee, or, more likely, a periodic fee or incorporated in the "Expected Cash Flow" rates.

Computer support will generally be useful in at least evaluating and pricing the SWAP at the time the contract is agreed to, as well as in calculating the periodic net settlements.

Receiving respective characteristics of said risks, referring to Plurality of Individuals 20, (or Group of Individuals 18, as is appropriate), involves Selecting Respective Descriptions of Risks 184 (in general, characteristics associated with the actual nature of the Contractual Exposures 16) from among Respective Insurance Risk Coverage of Individuals 172, Respective Contractual Insurable Risk Exposure to Individuals 174, Contractual Exposures From COLI Coverage of Individuals 176, Contractual Exposures from BOLI Coverage of Individuals 178, Corporate Contractual Benefit Payment Exposures to Individuals 180 or Contractual Exposures in a Reinsurance Treaty 182, as is specific to the particular transaction. Additional data input steps include Receiving Statistical Assumptions 134, and Financial Assumptions 136. All these information allows the computer to Process Descriptions and Assumptions 186 and Calculate Timing and Amounts of Benefits 188 associated with the risks, Plurality of Individuals 20 (or Groups of Individuals 18, as is the case). And more specifically the system calculates corresponding Expected Cash Flows for Time Periods in Block 138 (see FIG. 4). Agreed upon time periods could be annually, quarterly, monthly, or as defined by the parties.

Upon occurrence of events, actual cash flow data can be provided to the system though Receiving Actual Cash Flows Information in Block 148. The computer system then continues the process with Accounting for a First Party owing the Expected Cash Flows 150 and Accounting for the Second Party owing the Actual Cash Flows 152.

Another process involves the definition of the relationship between the actual cash flows and the expected cash flows and involves discussions between Second Party 4 and First Party 2 and among all or some of the parties identified by their computer systems in FIG. 8, such as the inventors, the parties, the consultants and other bodies providing input. The selection process is Selecting a Specific Definition of a Relationship between Expected Cash Flows and the Actual Cash Flows 198. The choices in the selection are A Relationship between the Expected Cash Flows and the Actual Cash Flows Reflecting a Symmetric Exchange of Non-proportional Contractual Exposures 192, Reflecting a Symmetric Exchange of Proportional Contractual Exposures 194 or Reflecting an Asymmetric Exchange of Proportional and Non-proportional Contractual Exposures 196. Assumptions of a large portfolio of lives and a known distribution of results, usually normal distribution, underlie the evaluation of proportional or non-proportional exposures and of symmetric or asymmetric exchanges which are relationships between actual and expected results. First Party 2 will evaluate the risks associated with the symmetric and proportional bases and negotiate with Second Party 4 the final relationship. As an example of a proportional and non-proportional asymmetric swap before incorporating margins and loadings, Second Party 4 could be accountable to the First Party 2 for 10% of all actual claims better than mean portfolio expected results in exchange for First Party 2 being accountable to Second Party 4 for all actual results in excess of 1.5 standard deviations of a normal distribution of portfolio expected results. Once the relationship has been defined, all Pricing Data Reflecting the Exchange 202 (including this relationship) is also coded into the computer system. The pricing process starts with evaluating the pure risk relationship between the cash flows. Then risk margins are incorporated. Profit margin and other pricing parameters (loadings) such as expenses are then incorporated. The price for the transaction can be a single fee, or a yearly fee incorporated into the expected results. The contract is expected to be renewable for durations of 30 plus years. As such a provision for early termination is reflected in an early termination fee agreed upon by both parties. The process continues to Computing a Net Settlement 154 reflecting such relationship and the corresponding pricing data. The net settlement is a payment by Second Party 4 of the excess of actual to expected cash flows and a payment by First Party 2 of the excess of expected to actual cash flows.

All input data and data resulting from the logic processes are stored in the computer with steps indicated in Blocks 142-146, 156-158, 190, 200, 204 and 206. These include storing Selected Descriptions of Risks 206, Statistical Assumptions 142, Financial Assumptions 144, Expected Cash Flows 146, Net Settlement 156, and Actual Cash Flows 158. Further included are storing the timing and amounts of Benefits 190, Selected Relationship between Expected and Actual Cash Flows 200, and Pricing Data 204.

FIGS. 6-6c shows the logic of the processes in the embodiment of the current invention as applied to securitizing funding for the contractual exposures.

First Party 2 could be a securitization pool. A securitization pool usually pays out a lump sum value in exchange for a series of future cash flows. A securitization pool has access to future cash flows and can be accountable for the expected cash flows in the transaction for this current invention.

Among Blocks 172-180, all pertaining to risks associated with contractual exposures to individuals, Block 212 allows for selecting Respective Descriptions of Risks as is appropriate for the transaction. The risks as appropriate to the transaction could be those received and associated with (1) Contractual Exposures from Respective Insurable Risk Coverage of Individuals 172, (2) Respective Contractual Risk Exposure to Individuals 174, (3) Contractual Exposures from COLI Coverage of Individuals 176, (4) Contractual Exposures from BOLI Coverage of Individuals 178, and (5) Corporate Contractual Benefit Payment Exposures to Individuals 180. The steps Receiving Statistical Assumptions for Said Risks 134 and Receiving Financial Assumptions for Said Risks 136 complete input of data. Then these data are processed to generate expected cash flows thru Block 214, Processing Responsive to Data Reflecting Securitizing of Funding for the Contractual Exposures, and Block 138, Calculating From the Descriptions and Assumptions, Expected Cash Flows Corresponding to Said Risks for Time Periods Block 148 provides actual cash flows information. With the expected cash flows and actual cash flows, the system allows Accounting for A First Party Owing the Expected Cash Flows to a Second Party 150, Accounting for the Second Party Owing the Actual Cash Flows to the First Party 152 and Computing a Net Settlement 154.

The computer system further Calculates the Impact of the Transaction on the Securitizing 218, and the Impact of the Transaction on Traunches for Securitizing 220 and then Determines the effect of said Transaction on a Securitization Pool 222. These processes incorporate the results of the transaction with the securitization pool and review the results of the securitization pool before and after incorporating the results of the transaction.

Blocks 142-144, 156-158, 216, 224-230, stores input data, processed data, and all data reflected in the processed model documents. These include Storing Selected Descriptions of Risks Associated with Individuals 216, Statistical Assumptions 142, Financial Assumptions 144, Expected Cash Flows reflecting Securitizing of Funding 224, Net Settlement 156 and Actual Cash Flows 158. Further included is Storing the Impact of Transaction on Securitizing 226, on Traunches for Securitizing 228 and on the Securitization Pool 230.

All these detailed processes are coded into the Computer System 32.

FIGS. 7-7f shows the logic of the processes in the embodiment of the current invention as applied more generally to Contractual Exposures 16. Receiving Respective Description of Risks 132 (see FIG. 4) involves Selecting Respective Descriptions Associated with Specific Contractual Exposures 184 (the choices are insurable risk coverage from individuals, insurable risk exposure to individuals, exposures from COLI, exposures from BOLI, corporate contractual exposures or exposures in a reinsurance treaty) and further Receiving Nominal Death Benefit Face Amounts 242. Block 132 also involves Selecting Respective Characteristics Associated with Individuals or a Group of Individuals 250 (Blocks 246 and 248 allowing for these choices) and further Receiving at least One Characteristic as Age, Sex, Mortality Rating, Morbidity Rating, Compensation, Position, Job class and Years of Service 244. By Block 250, the Contractual Exposures 16 would become specific to either individuals or group of individuals. The risk characteristics as coded into the system are reflective of whether the contractual exposures are for individuals or for a group of individuals. For a group of individuals, it is not uncommon to group the lives and then use an average risk characteristic such as a central average age or even a weighted average mortality rating.

These characteristics define the insurable risks and allows for the Selection of Specific Rates of Decrement 264 (in processes 256-262 the applicable rates of decrement to the risk exposures are identified for selection; general rates of decrement, those associated with insurable risk coverage of individuals, with insurable risk exposures to individuals and with a reinsurance treaty) and the further Receiving of Expected Mortality Rates 254 in the Receipt of Statistical Assumptions 134 (see FIG. 4).

The step Receipt of Financial Assumptions 136 (see FIG. 4) further includes receiving at least one of the following information, a Discount Rate, an Expense or a Fee 252. A discount rate is normally used in evaluating a current valuation of the risks, the cost and the fee. Expenses or fees associated with the transaction are also included in the valuations.

Next step is Receiving Data Identifying the Second Party 272, Data Identifying the Transaction Binding the Parties 270 and Data Identifying the Transaction as Having a Portion Renewable 268. These information complete transaction data reflected in the processed model documents.

Margins and Loadings are Incorporated in Developing Expected Mortality Rates 274 to Determine Expected Timing and Amount of Death Benefits 276 and Calculate Expected Cash Flows 138. Expected Timing and Expected Amount of Death Benefits are Tracked 280. With Receipt of Actual Cash Flows Information 148 and Receipt of Information on Actual Timing and Actual Amounts of Death Benefits 266, Actual Timing and Actual Amounts of Death Benefits are Tracked 282 as well. Further Accounting for a First Party Owing Expected Cash Flows 150, Accounting for the Second Party Owing the Actual Cash Flows 152, and Computing a Net Settlement, for each said Time Periods 154, Net Settlements are Tracked 284. Historical Records 286 are also maintained.

Statistical methodologies are coded into the system. Expected rates of decrements are used in these methodologies. Valuations of expected results are also done by the system. Scenarios testing of actual results versus expected results are also evaluated. Then actual results with expected results are tracked.

The output Provides the Second Party with Documentation of Cash Flows 288, Illustration of a Transaction Fee from the Second Party to the First Party 290 and further illustrating said Transaction Fee Incorporated in the Net Settlement 292. An additional process is Accounting for the First Party Receiving a Fee for Early Termination of Transaction 294 to mitigate one party's ability to control whether termination takes place or not. All relevant financial data are illustrated to allow Second Party 4 to evaluate results and results to-date. Similarly for First Party 2.

Input data are updated regularly and as desired in Block 278. Blocks 206, 142-144, 300, 156-158, 296-298, 302-306, 308-324 allow for storing all input data and all processed data. These include selected descriptions of risks, statistical assumptions, financial assumptions, expected cash flows, net settlement and actual cash flows. For the descriptions of risks, further included are nominal death benefit face amounts, characteristics of risks such as mortality rating, and identification of whether risks are evaluated as individuals or as a group of individuals. Statistical assumptions are further defined with expected mortality rates and specific rates of decrement. Financial assumptions include at least a discount rate, an expense or a fee. Expected cash flows further include margins and loadings in the expected mortality rates, and expected timing and expected amounts of death benefits resulting from these mortality rates. Actual cash flows data include actual timing and actual amount of death benefits for each life. All corresponding historical information is also stored. Further stored are transaction data such as party with ownership rights to contractual exposures, binding contract and renewability of contract.

FIG. 8 shows the involvement of the invertors' network of computer systems as well as the computer systems of all interested and involved parties, Blocks 342-358. These are the computer systems for First Party 342, Second Party 344, Tax Advisors 346, Accounting Advisors 348, Marketing Advisors 350, Legal Advisors 352, Securitization Pool 354, Other Consultants 356, and Regulatory Bodies 358. These interested and involved bodies include the inventors, the parties to the transaction, consultants and other bodies that provide input data to the transaction. Information shared among these bodies includes Financial Analysis Output 58 and Processed Model Documents 60.

FIG. 9 summarizes the embodiment of the current invention as a swap investment security Block 362. The swap investment security is similar to a catastrophe bond. The security will be in the form of a preferred stock or a subordinated debt such that the investment return of the investor will be a fixed-income return 364 plus or minus the results of the mortality swap Transaction 6, the current invention. Building the Mortality Swap into a debt instrument will produce a security that resembles a Catastrophe Bond in the P&C market, but with the unique characteristics of life risk transfer. Like a Catastrophe Bond, insurance risk is transferred to a Capital Markets instrument; unlike Cat Bonds, the security holder has upside as well as downside insurance profit/loss potential, and the bond may be structured as a Surplus Note, providing Capital to an insurer who issues it.

The bond would be issued for cash for a specific term (or it could be a perpetual) and would pay a coupon rate, supported by the investment income on the cash, plus a mortality differential equal to expected mortality minus actual mortality. The differential could either be positive or negative and, if negative greater than the interest, it could invade the principle to a specified limit.

A variation that used some or all of early year positive results to build a "buffer" fund (which earned interest) might be used in more volatile-prone situations.

A second variation would be to pay a higher rate and only charge losses against the instrument, perhaps with a carry-forward of the loss to be recovered out of future mortality gains.

Again, consider employers, including banks and other financial institutions, which maintain BOLI/COLI programs and hold BOLI/COLI policies as funding vehicles for future liabilities; such future liabilities including but not limited to deferred compensation or other post retirement employee benefits (OPEB). These corporations own future actual mortality cash flows from the programs. Now, consider for example, another embodiment that provides some interesting characteristics. This embodiment can be carried out as a SWAP of expected cash flows for actual cash flows, or the like, for example, either on a "proportional", "non-proportional", "symmetric", or "asymmetric" basis (es) with a portion of the expected cash flows used to effect a securitization. The receipt of some or all of the present value, time value of money with interest and contingency, of the expected mortality cash flows can be matched up to the liability flows that are being funded, essentially. The liquidity aspect of the embodiment provides flexibility to BOLI/COLI programs, and to the liability funding. This embodiment could also provide an approach to funding life settlement pools.

Combinations: As previously stated, consideration has been requested for carrying forward each of the applications from which priority and incorporation by reference has been set out above, and in using the information in those applications incorporation by reference, as well as improvements on any and all of the foregoing, with embodiments including those: separate, combined, and/or improved upon. Consider the following examples of combining the embodiments in Cash Flows, Redundant Reserve, Multi-jurisdiction, and Segmenting Risk.

More particularly, consider capital funding insurance programs. For example, a corporation takes out life insurance on the lives of certain employees, retirees or other persons in which it has an insurable interest. The corporation is the owner, premium payer and beneficiary of the insurance policies. A capital funding insurance program can be used as an efficient funding vehicle for long-term liabilities, or to generate an efficient return for pre-funding future capital needs. Further consider a patent-pending computer program product which generates and maintains a jurisdictional database, containing legal requirement data, regulatory rules and requirements, taxation rules, accounting rules and other pertinent data and further illustrates valuations of parts of a financial product reflecting financial objectives, by allowing selection of jurisdictions for placements of parts of the financial product.

In another embodiment of the invention, a first party to the swap transaction owes expected cash flows to the second party to the transaction. The second party owes the actual cash flows to the first party. The actual cash flows could be reflective of valuations of parts of a financial product that meet some of the financial objectives of the second party.

Again, entities that own future actual mortality cash flows and want to eliminate the uncertainty in the timing and in the amount of these cash flows, for example, employers using BOLI/COLI as funding vehicles for future liabilities, securitization programs for life insurance funding such as charity, and any other organization that requires more predictable cash flows. These entities, second party to the transaction, would swap their actual cash flows for expected cash flows. Also, there are corporations that are logical counterparties to these entities, such as, life reinsurers and large well funded Defined Benefit Pension Plans, where the life insurance risks taken on the swap would be general hedges against their current life reinsurance portfolio and their longevity risks, respectively. These corporations, first party to the transaction, counterparty to the transaction, would swap expected cash flows for the second party's actual cash flows. The analyses for development of the swap terms are included as part of this invention. Accordingly, pure expected cash flows could be developed consistent with the stochastically modeled actual cash flows reflecting the relationship embodied in the exchange—symmetric proportional or non-proportional or asymmetric proportional and non-proportional—and applied to some historical actual experience. The swap terms could be reflective of some underlying policies owned by the above mentioned entities, second party to the transaction.

In another embodiment of the invention, first party to the invention could be a high credit quality retrocession pool. Such a retrocession pool could be another party, one of the parties to a patent-pending computer-aided method for managing an insurance reserve requirement by segmenting a reinsurance transaction. Certain life insurance products, such as guaranteed level premium products have stringent regulatory reserve requirements. An embodiment of mentioned patent-pending computer-aided method for managing an insurance reserve requirement by segmenting a reinsurance transaction incorporates reinsurance using a segregated cell, retrocession of the mortality risk to a high quality retrocession pool, posting the "economic reserves" in an acceptable trust, and funding the excess reserves, posted in a second trust, by the issuance of securities into the capital markets. The ceding company in the reinsurance transaction would have the right to invade the trusts (economic reserves first) should the reinsurer not meet its obligations under the contract. Hence the need for a high quality retrocession pool so that the investor would feel comfortable that all mortality claims will be paid. Pool members would further agree that, should one of their number become weakened, the others would assume their portion of the risk and credit for their portion of the economic reserves being held in a "last man standing" retrocession pool. The credit quality of the retrocession pool is higher than the credit quality of each member of the pool.

Computer Operations

By way of an overview, in addition to the computer systems identified in the patent applications from which priority is claimed as well as those incorporated by reference, and any improvement(s) hereby provided, computer support for any of the embodiments can include upstream, midstream, and/or downstream computing. Illustratively, consider insurance (or annuity product, though other financial products are certainly usable and intended to be within the teaching provided by this example) as a financial product.

Upstream computer support can extend to consumer computer operations, e.g., obtaining a quote for an insurance policy (that is subsequently comprised in an embodiment such as a Mortality Swap) and/or electronically submitting information for an application for the insurance policy, as well as corresponding computing on the other end of the consumer's communications, e.g., intermediary operations, e.g., of a broker, web site, or other intermediary, insurance company operations, e.g. which formulate or provide the insurance policy, carry out underwriting and other approval computing, policy issuance, policy implementation, claims handling, etc.).

There can also be "midstream" computing, a term which generally relates to computer systems identified in the patent applications from which priority is claimed as well as those incorporated by reference above, and any improvement(s) hereby provided. In the instant illustrative example, midstream computing can include combining the insurance policy to form a group, e.g., in carrying out such as a Mortality Swap (etc.) and computing for each of the parties, etc.

Note that there can also be downstream computing. For example, there can be a computer which uses financial information corresponding to the midstream embodiment as input for computing broader financial data, such as computing to produce a quarterly report, an earnings report, tax information, or a report to a regulatory institution. More particularly, for this example, there can be a computer programmed to use financial information for, illustratively a Mortality Swap, in computing to produce a quarterly report, an earnings report, and/or tax information. If a particular jurisdiction requires regulatory approval and/or compliance for an embodiment, e.g., of a swap or a derivative, the computer system can also do the computing, calculating, and report generating for regulatory approval/compliance. In any of these upstream or downstream applications, there can also be electronic transmission and receiving of data using a network between transmitting and receiving computers.

A. Upstream Computer Operations

Reference is made to U.S. Pat. No. 6,684,189 issued on 27 Jan. 2004 and titled "Computer System for Producing an Illustration of Insurance Optionally Including a Mortgage Repayment; and Ser. No. 09/313,293 filed 14 May 1999 and titled "Forming an Application for a Financial Product," both of which are incorporated by reference. These illustrate systems, the departure from which can be made according to embodiments herein. A potential consumer for a financial product (illustratively in this example, such as an insurance policy) ultimately incorporated into an embodiment herein can use a computer terminal (e.g., with at least one processor, output device, input device, and memory) such as that shown in U.S. Pat. No. 6,684,189 and Ser. No. 09/313,293 to obtain a quote for the insurance policy and can also submit an application to obtain the insurance policy. Communications to and from the consumer computer terminal can be carried out over the Internet to obtain the quote and to submit the application.

Computing for the financial product provider, in this example an insurance carrier (but note alternative illustrative financial products set out in U.S. Pat. No. 6,684,189 and Ser. No. 09/313,293), to carry out underwriting and other computer operations. The insurance carrier can do the underwriting and other computing, e.g., as set out in Ser. No. 10/262, 185 filed 1 Oct. 2002 and titled "Virtual Finance/Insurance Company", U.S. Pat. No. 5,523,942 issued on 4 Jun. 1996 and titled "Design Grid for Inputting Insurance and Investment Product Information in a Computer System"; and U.S. Pat. No. 4,975,840 issued on 4 Dec. 1990 and titled "Method and Apparatus for Evaluating a Potentially Insurable Risk", all of which are incorporated by reference. Note that financial products and other products can find suitable support hereby as well, and in the financial products and system integration extending to U.S. Pat. No. 5,655,085 issued 5 Aug. 1997 and titled "Computer System for Automated Comparing of Universal Life Insurance Policies Based on Selectable Criteria"; U.S. Pat. No. 5,673,402 issued on 30 Sep. 1997 and titled "Computer System for Producing an Illustration of an Investment Repaying a Mortgage," both of which are incorporated by reference.

B. Downstream Computer Operations

One of the parties or entities involved with an embodiment can do downstream computer operations. Such operations can include generating approval and/or documentation output for regulatory compliance, and if desired, electronically communicate the output to the regulator's computer. For example, consider a derivative according to an embodiment herein. There are two types of derivatives, exchange traded and (over the counter) OTC, and exchange traded derivatives are regulated, for example, in the US, where OTC derivatives are not, at least yet. The focus has been on credit derivatives, which are always OTC, as they are specific to an individual credit. While a pure swap could be carried out OTC, securities with an embedded swap are regulated now in the US and other jurisdictions. Computer operations can include producing, from input financials from an embodiment herein (e.g., a Cash Flows mortality swap), output to support regulatory compliance, or approval (corresponding to the laws applicable to the jurisdiction and corresponding to the embodiment preferred).

Similarly, downstream computer operations can include producing, from input financials of an embodiment, tax documentation—as well as electronically communicating the documentation to the corresponding authorities. Note that this can have particular application in cross-boarder taxation for a Multi-jurisdictional embodiment.

Downstream computer operations can include producing, from input financials from an embodiment herein (e.g., a Cash Flows mortality swap), a report of income, earnings, or otherwise, e.g., a corporate earnings report or a quarterly report, and if desired, electronically communicating the report, e.g., over a network to another computer, posting the report to a web site, etc.

Note one computer in this over-all system of cooperation can be at any geographic location or jurisdiction. For example, a consumer's computer can be in, say, the US; the intermediary computer or a web site (server) can be in the US; the carrier (or other entity) can be in the US, and indeed the computer support for a foreign carrier can be in the US; the entity facilitating an embodiment herein can be in the US; the corporation or entity doing the regulatory compliance or forming the earnings, tax, income or other reporting can be in the US—with or without the others of these being in the US (in this example, US as a jurisdiction is exemplary only as the principle of computers located distinctly is intended to be more generally applicable.

Note that the preceding is a prophetic teaching and although only a few exemplary embodiments have been described in detail herein, and given the teaching, those skilled in the art will readily appreciate that many modifications are possible in the exemplary embodiments without materially departing from the novel teachings and advantages herein.

Accordingly, all such modifications are intended to be included within the scope herein. Note too that the language herein is intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment fastening wooden parts, a nail and a screw may be equivalent structures.

We claim:

1. A method of using a computer system to manage cash flows for a swap transaction, the method including:
   accessing, by a digital electrical computer, expected cash flows information corresponding to risks for time periods, the expected cash flows information calculated from respective descriptions of the risks, statistical assumptions for the risks, and financial assumptions for the risks;
   accessing, by the computer, actual cash flows information from occurrence of events corresponding to said risks;
   accounting, by the computer using said information, for a first party to the swap transaction owing the expected cash flows to a second party to the swap transaction and accounting for the second party owing the actual cash flows to the first party so as to allow computing a settlement, for each of said time periods, between the parties in the swap transaction to manage the actual cash flows and the expected cash flows; and
      producing, by the computer, output indicating at least one of: the first party owing to the second party, the second party owing to the first party, and the settlement.

2. The method of claim 1 further including:
   computing a present value of a portion of said expected cash flows information in connection with a securitization of said portion of said expected cash flows; and
   outputting the present value in connection with the securitization in facilitating the securitization.

3. The method of claim 1 further including the steps of:
   receiving respective descriptions of risks;
   receiving statistical assumptions for said risks;
   receiving financial assumptions for said risks;
   calculating, by a computer processor, from the descriptions and from the assumptions, the expected cash flows information.

4. The method of claim 3, wherein the receiving corresponds to communicating with an accounting advisors computer system.

5. The method of claim 1 further including communicating the output to a computer system corresponding to one of the parties to the swap transaction to facilitate carrying out the swap transaction.

6. A method of using a computer system to manage cash flows for a swap transaction, the method including the steps of:
   communicating, from a first computer, actual cash flows information from occurrence of events corresponding to risks, to a digital electrical computer system which
   processes the actual cash flows information in connection with expected cash flows corresponding to the risks for time periods, the expected cash flows calculated from respective descriptions of the risks, statistical assumptions for the risks, and financial assumptions for the risks,
   performs an accounting for a first party to the swap transaction owing the expected cash flows to a second party to the swap transaction, and an accounting for the second party owing the actual cash flows to the first party, wherein the accounting for the first party and the accounting for the second party are such as to allow a settlement, for each of said time periods, between the parties in the swap transaction to manage the actual cash flows and the expected cash flows, and
   produces output indicating at least one of: the first party owing to the second party, the second party owing to the first party, and the settlement; and
   corresponding to said communicating, receiving the output from the computer system at the first computer.

7. An apparatus configured to manage cash flows for a swap transaction, the apparatus including:
   a first computer electronically communicating actual cash flows information, from occurrence of events corresponding to risks, to a computer system comprising
      memory operably associated with a digital electrical computer,
         the memory storing expected cash flows information corresponding to risks for time periods, the expected cash flows information calculated from respective descriptions of the risks, statistical assumptions for the risks, and financial assumptions for the risks, and actual cash flows information from occurrence of events corresponding to the risks,
      the digital electrical computer configured to carry out the operations of:
         accounting, by accessing the memory and using said information, for a first party to the swap transaction owing the expected cash flows to a second party to the swap transaction and accounting for the second party owing the actual cash flows to the first party, sufficient to allow computing a settlement, for each of said time periods and between the parties in the swap transaction to manage the actual cash flows and the expected cash flows, and producing output indicating at least one of: the first party owing to the second party, the second party owing to the first party, and the settlement, and
   corresponding to said communicating, receiving the output from the computer system at the first computer.

8. The apparatus of claim 7, wherein the second digital electrical computer is configured to carry out the operations of:
   receiving respective descriptions of risks;
   receiving statistical assumptions for said risks;
   receiving assumptions for said risks;
   calculating, by a computer processor, from the descriptions and the assumptions, the expected cash flows information.

9. The apparatus of claim 8, wherein the receiving is carried out by communication with an accounting advisors computer system.

10. The apparatus of claim 8, wherein the digital computer system communicates the output to a computer system corresponding to one of the parties to the swap transaction to facilitate the swap transaction.

11. An apparatus configured to manage cash flows for a swap transaction, the apparatus including:
   a first computer communicating actual cash flows information from occurrence of events corresponding to risks, to
      a digital electrical computer system which
      processes the actual cash flows information in connection with expected cash flows corresponding to the risks for time periods, the expected cash flows calculated from respective descriptions of the risks, statistical assumptions for the risks, and financial assumptions for the risks,
      performs an accounting for a first party to the swap transaction owing the expected cash flows to a second party to the swap transaction, and an accounting for the second party owing the actual cash flows to the first party, wherein the accounting for the first party and the accounting for the second party are such as to allow a settlement, for each of said time periods, between the parties in the swap transaction to manage the actual cash flows and the expected cash flows, and produces an indication of at least one of: the first party owing to the second party, the second party owing to the first party, and the settlement; and corresponding to said communicating, the first computer receives the indication from the computer system and outputs the indication at an output device operably associated with the first computer.

12. The method of claim 6, further including communicating with another computer system which provides the expected cash flows.

13. The apparatus of claim 7, further including another computer system which provides the expected cash flows.

14. The apparatus of claim 11, further including another computer system which provides the expected cash flows.

15. A method of using a computer system to manage cash flows for a swap transaction, the method including:

facilitating a swap transaction having a first party owing expected cash flows to a second party and the second party owing actual cash flows to the first party, by receiving, by a computer system, respective descriptions of risks, receiving, by the computer system, statistical assumptions for said risks, receiving, by the computer system, financial assumptions for said risks, calculating, by the computer system, from the descriptions and from the assumptions, the cash flows information, and communicating the expected cash flows information which is received by a digital electrical computer system which processes actual cash flows information in connection with the expected cash flows corresponding to the risks for time periods, performs an accounting for a first party to the swap transaction owing the expected cash flows to a second party to the swap transaction, and an accounting for the second party owing the actual cash flows to the first party, wherein the accounting for the first party and the accounting for the second party are such as to allow a settlement, for each of said time periods, between the parties in the swap transaction to manage the actual cash flows and the expected cash flows, and produces output indicating at least one of: the first party owing to the second party, the second party owing to the first party, and the settlement.

16. The method of claim 15, further including:

computing a present value of a portion of said expected cash flows information in connection with a securitization of said portion of said expected cash flows; and outputting the present value in connection with said securitization in facilitating the securitization.

17. A computer system configured to manage cash flows for a swap transaction, the apparatus including:

a computer system engaged to facilitate a swap transaction having a first party owing expected cash flows to a second party and the second party owing actual cash flows to the first party, the computer system receiving respective descriptions of risks, receiving statistical assumptions for said risks, receiving financial assumptions for said risks, calculating expected cash flows information from the descriptions and from the assumptions, and communicating the expected cash flows information which is received by a digital electrical computer system, which carries out processing actual cash flows information in connection with the expected cash flows information corresponding to the risks for time periods, performing an accounting for the first party to the swap transaction owing the expected cash flows to the second party to the swap transaction, and an accounting for the second party owing the actual cash flows to the first party, wherein the accounting for the first party and the accounting for the second party are such as to allow a settlement, for each of said time periods, between the parties in the swap transaction to manage the actual cash flows and the expected cash flows, and producing output indicating at least one of: the first party owing to the second party, the second party owing to the first party, and the settlement.

18. The apparatus of claim 11, further including:

computing a present value of a portion of said expected cash flows information in connection with a securitization of said portion of said expected cash flows; and outputting the present value in connection with said securitization in facilitating the securitization.

* * * * *